US012494118B2

(12) United States Patent
Park

(10) Patent No.: US 12,494,118 B2
(45) Date of Patent: Dec. 9, 2025

(54) APPARATUS AND METHOD FOR MANAGING SAFETY OF WORKER

(71) Applicant: ELSSEN CO., LTD., Daejeon (KR)

(72) Inventor: Jiman Park, Daejeon (KR)

(73) Assignee: ELSSEN CO., LTD., Daejeon (KR)

( * ) Notice: Subject to any disclaimer, the term of this patent is extended or adjusted under 35 U.S.C. 154(b) by 376 days.

(21) Appl. No.: 18/113,875

(22) Filed: Feb. 24, 2023

(65) Prior Publication Data

US 2024/0290188 A1 Aug. 29, 2024

(51) Int. Cl.

| | |
|---|---|
| ***G08B 13/00*** | (2006.01) |
| ***A62B 35/00*** | (2006.01) |
| ***G01D 21/02*** | (2006.01) |
| ***G08B 21/02*** | (2006.01) |

(52) U.S. Cl.

CPC .......... *G08B 21/02* (2013.01); *A62B 35/0037* (2013.01); *G01D 21/02* (2013.01)

(58) Field of Classification Search

CPC . G08B 21/02; A62B 35/0037; A62B 35/0025; A62B 35/0075; G01D 21/02

USPC .......................................................... 340/541

See application file for complete search history.

(56) References Cited

U.S. PATENT DOCUMENTS

| | | | | |
|---|---|---|---|---|
| 2021/0248892 A1* | 8/2021 | Lee | .................... | G08B 21/0438 |
| 2021/0358282 A1* | 11/2021 | Lin | .................... | G08B 21/0461 |

FOREIGN PATENT DOCUMENTS

KR 10-2016-0123642 A 10/2016

* cited by examiner

*Primary Examiner* — Tai T Nguyen

(74) *Attorney, Agent, or Firm* — Bridgeway IP Law Group, PLLC; Sang Ho Lee; Hyun Woo Shin

(57) ABSTRACT

An apparatus and method for safety management and a safety management method includes determining whether a safety hook connected through a connecting rope provided to a safety belt worn by a worker is fastened to a safety equipment; loading a first score set in response to whether the safety hook is fastened to the safety equipment and a second score set in response to a duration of a state in which the safety hook is unfastened to the safety equipment, according to a result of the determination; receiving, from a first sensor unit, a first detection signal of detecting an altitude of a worksite in which the worker is working; loading a third score set in response to the first detection signal; and determining a risk level of the worker from a summation result of the first score, the second score, and the third score.

16 Claims, 13 Drawing Sheets

(a)

| Safety hook | State points | Unfastened time (including malfunctioning time) | Score for unfastening | Altitude | Score for altitude |
|---|---|---|---|---|---|
| fastened | 0 | Less than 3 seconds: unfastened, but preferentially determined as being fastened | 1 | 1 m or less | 3 |
| Unfastened | 5 | Between 3 and 5 seconds | 15 | Between 1 and 2 m | 5 |
| Poorly | 5 | 5 seconds or more | 25 | 2 m or more (2 to 5 m) | 10 |

(b)

| | |
|---|---|
| Less than 10 points | Safe |
| 10 ~ 20 | Concern |
| 20 ~ 30 | Caution |
| 30 ~ 40 | Vigilance |
| 40 or more | Serious (accident) |

FIG. 11

APPARATUS AND METHOD FOR MANAGING SAFETY OF WORKER

FIELD OF THE INVENTION

Example embodiments relate to an apparatus and method for managing safety of a worker that may detect a fastening state of a safety hook included in a safety belt worn by a worker and may predict a risk level of work.

DESCRIPTION OF THE RELATED ART

In general, various types of accidents, such as fall, electric shock, and suffocation, may occur at industrial sites. Here, representative examples may include a fall accident caused by falling of a worker present on a high floor and an accident caused by a falling object.

To minimize injury to a worker by such accident, workers may wear various types of safety equipment. Here, many workers do not properly wear safety equipment since it is cumbersome or inconvenient to work and continue to work in a state of being exposed to safety accidents.

The foregoing background art is technical information possessed by the inventor for derivation of the present invention or acquired in a process of deriving the present invention and may not be necessarily known art disclosed to the general public prior to filing the present invention.

SUMMARY OF THE INVENTION

An objective of at least one example embodiment is to attach a sensor device to a safety belt worn by a worker and to detect a fastening state of a safety hook through a detection signal of the sensor device.

An objective of at least one example embodiment is to attach a sensor device to a safety belt worn by a worker and to predict a risk level of the worker by analyzing a detection signal of the sensor device.

The objectives to be solved by the present invention are not limited to the aforementioned objectives and other objectives and advantages of the present invention may be understood from the following description and may be clearly understood by example embodiments. Also, objectives and advantages to be solved by the present invention may be implemented by methods and combinations included in the claims.

According to an aspect of at least one example embodiment, there is provided a safety management method of a worker, including determining whether a safety hook connected through a connecting rope provided to a safety belt worn by a worker is fastened to a safety equipment; loading a first score set in response to whether the safety hook is fastened to the safety equipment and a second score set in response to a duration of a state in which the safety hook is unfastened to the safety equipment, according to a result of the determination; receiving, from a first sensor unit, a first detection signal of detecting an altitude of a worksite in which the worker is working; loading a third score set in response to the first detection signal; and determining a risk level of the worker from a summation result of the first score, the second score, and the third score.

According to an aspect of at least one example embodiment, there is provided a safety management apparatus of a worker, including a processor; and a memory configured to operatively connect to the processor and to store at least one code performed by the processor. Here, when executed through the processor, the memory stores a code that causes the processor to determine whether a safety hook connected through a connecting rope provided to a safety belt worn by a worker is fastened to a safety equipment, to load a first score set in response to whether the safety hook is fastened to the safety equipment and a second score set in response to a duration of a state in which the safety hook is unfastened to the safety equipment, according to a result of the determination, to receive, from a first sensor unit, a first detection signal of detecting an altitude of a worksite in which the worker is working, to load a third score set in response to the first detection signal, and to determine a risk level of the worker from a summation result of the first score, the second score, and the third score.

Also, according to an aspect of at least one example embodiment, there is provided a non-transitory computer-readable recording medium storing a computer program to implement the method and other methods and other systems for implementing the present invention.

Other aspects, features, and advantages other than those described above will become apparent from the following drawings, claims, and detailed description.

According to some example embodiments, it is possible to prevent a safety accident of a worker by attaching a sensor device to a safety belt worn by the worker, by detecting a fastening state of a safety hook through a detection signal of the sensor device, and by generating an alarm when the safety hook is unfastened.

Also, according to some example embodiments, it is possible to prevent a safety accident of a worker by attaching a sensor device to a safety belt worn by the worker, by predicting a risk level of the worker through analysis of a detection signal of the sensor device, and by generating an alarm corresponding to a risk level of the worker.

The effects are not limited thereto and other effects not described herein may be clearly understood by one of ordinary skill in the art from the following description.

BRIEF DESCRIPTION OF DRAWINGS

These and/or other aspects, features, and advantages of the invention will become apparent and more readily appreciated from the following description of embodiments, taken in conjunction with the accompanying drawings of which:

FIG. 11 illustrates an example of determining a risk level of a worker according to an example embodiment;

DETAILED DESCRIPTION OF THE INVENTION

Figure 1:
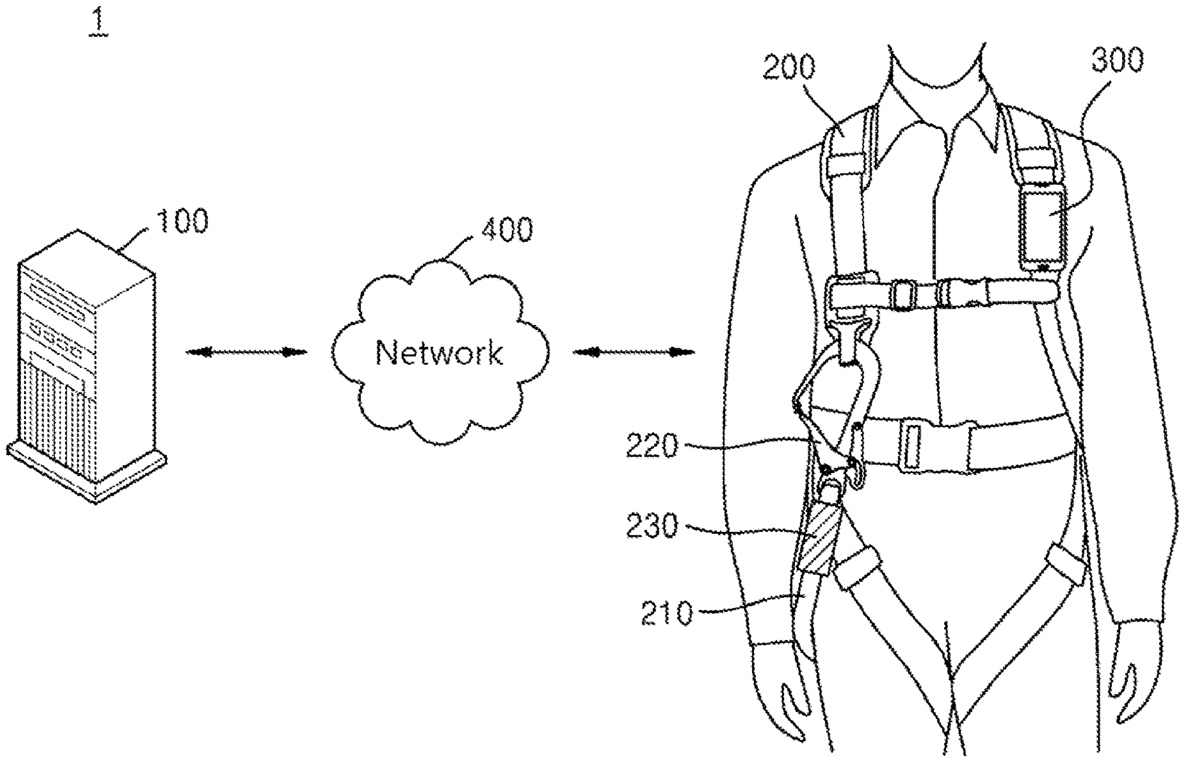
FIG. 1 illustrates an example of a safety management environment of a worker according to an example embodiment.

Advantages and features of the disclosure and methods for achieving the same will become clear with reference to the accompanying drawings and example embodiments. However, it should be understood that these example embodiments are not construed as being limited to the illustrated forms and should be understood to include all changes, equivalents, and replacements within the idea and the technical scope of the disclosure. The following example embodiments are provided to make the disclosure complete and to inform one of ordinary skill in the art to which the disclosure pertains of the scope of the disclosure. When detailed description related to the known art is determined to make the disclosure ambiguous, the detailed description is omitted.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Although terms of "first," " "second," and the like are used to explain various components, the components are not limited to such terms. These terms are used only to distinguish one component from another component.

Also, the term "~ unit" used herein may refer to a hardware component, such as a processor or a circuitry, and/or a software component executed by a hardware component, such as a processor.

Hereinafter, example embodiments will be described in detail with reference to the accompanying drawings. When describing the example embodiments with reference to the accompanying drawings, like reference numerals refer to like components and repeated description related thereto will be omitted.

FIG. 1 illustrates an example of a safety management environment of a worker according to an example embodiment. Referring to FIG. 1, a safety management environment 1 of a worker may include a safety management apparatus 100, a safety belt 200 worn by the worker, a worker terminal 300 carried by the worker, and a network 400. The safety belt 200 worn by the worker according to the example embodiment may include a connecting rope 210, a safety hook 220, and a sensor device 230.

The safety management apparatus 100 may determine whether the safety hook 220 connected through the connecting rope 210 provided to the safety belt 200 worn by the worker is fastened to a safety equipment (e.g., safety rope, safety scaffold, etc.).

The safety management apparatus 100 may receive sensing signals from sensor units (e.g., first sensor unit 231 to fifth sensing unit 235 of FIG. 9) provided to the sensor device 230 to determine whether the safety hook 220 is fastened to the safety equipment.

When the safety hook 220 is unfastened to the safety equipment as a result of determining whether the safety hook 220 is fastened to the safety equipment, the safety management apparatus 100 may generate an alarm signal for inducing the safety hook 220 to be fastened to the safety equipment and may transmit the alarm signal to the worker terminal 300.

The safety management apparatus 100 may load a first score set in response to whether the safety hook 220 is fastened to the safety equipment and a second score set in response to a duration of a state in which the safety hook 220 is unfastened to the safety equipment, according to a result of determining whether the safety hook 220 is fastened to the safety equipment.

The safety management apparatus 100 may receive, from a first sensor unit (231 of FIG. 9) provided to the sensor device 230, a first detection signal of detecting an altitude of a worksite in which the worker is working. The safety management apparatus 100 may load a third score set in response to the first detection signal.

The safety management apparatus 100 may determine a risk stage of the worker from a summation result of the first score, the second score, and the third score. The safety management apparatus 100 may determine one of five stages of risk levels including a safe stage, a stage of concern, a stage of caution, a stage of vigilance, and a serious stage according to the summation result of the first score, the second score, and the third score. The safety management apparatus 100 may generate an alarm signal corresponding to one of the five stages of risk levels and may transmit the alarm signal to the worker terminal 300.

The worker may wear the safety belt 200 at a worksite. The worker may fasten, to the safety equipment, the safety hook 220 connected through the connecting rope 210 provided to the safety belt 200. The sensor device 230 may detect whether the safety hook 220 is fastened to the safety equipment. Hereinafter, detailed description related to the connecting rope 210, the safety hook 220, and the sensor device 230 will be made with reference to FIGS. 2 to 9.

Herein, the safety management apparatus 100 may be independently present in a form of a server. Alternatively, functions provided from the safety management apparatus 100 may be implemented in a form of an application and loaded to the worker terminal 300. Also, the safety management apparatus 100 may be provided to the sensor device 230. Also, some components of the safety management apparatus 100 may be provided to the sensor device 230, and remaining components of the safety management apparatus 100 may be independently present or mounted to the worker terminal 300.

The worker terminal 300 may receive a safety management service through access to a safety management site and/or a safety management application provided from the safety management apparatus 100.

The worker terminal 300 may include a communication terminal capable of performing the functionality of a computing device (not shown) and, in addition to a smartphone, may be a desktop computer, a laptop computer, a tablet PC, a smart TV, a mobile phone, a personal digital assistant (PDA), a media player, a micro-server, a global positioning system (GPS) device, an E-book terminal, a digital broadcasting terminal, a navigation, a kiosk, an MP3 player, a digital camera, an electronic device, and other mobile or non-mobile computing devices, which are manipulated by the worker but not limited thereto. Also, the worker terminal 300 may be a wearable terminal equipped with a communication function and a data processing function, such as a watch, glasses, a hairband, and a ring. The worker terminal 300 is not limited to the aforementioned examples and any terminal capable of web browsing may be employed without limitation.

The network 400 may serve to interconnect the safety management apparatus 100, the sensor device 230, and the worker terminal 300. The network 400 may include, for example, wired networks such as local area networks (LANs), wide area networks (WANs), metropolitan area networks (MANs), integrated service digital networks (IS- DNs), and the like, and wireless networks such as wireless LANs, code division multiple access (CDMA), Bluetooth, satellite communication, and the like. However, it is provided as an example only. Also, the network 400 may transmit and receive information using near field communication and/or far field communication. Here, the near field communication may include Bluetooth, radio frequency identification (RFID), infrared data association (IrDA), ultra-wideband (UWB), ZigBee, and wireless fidelity (Wi-Fi) technology, and the far field communication may include code division multiple access (CDMA), frequency division multiple access (FDMA), time division multiple access (TDMA), orthogonal frequency division multiple access (OFDMA), and single carrier frequency division multiple access (SC-FDMA) technology.

The network 400 may include connection between network elements, such as a hub, a bridge, a router, and a switch. The network 400 may include at least one connected network, for example, a multi-network environment, including a public network such as the Internet and a private network such as a secure enterprise private network. Access to the network 400 may be provided through at least one wired or wireless access network.

Also, the network 400 may support controller area network (CAN) communication, vehicle-to-infrastructure (V2I) communication, vehicle-to-everything (V2X) communication, wireless access in vehicular environment (WAVE) communication technology, an Internet of Things (IoT) network that exchanges and processes between distributed constituent elements such as things, and/or 5G communication.

Figure 2:
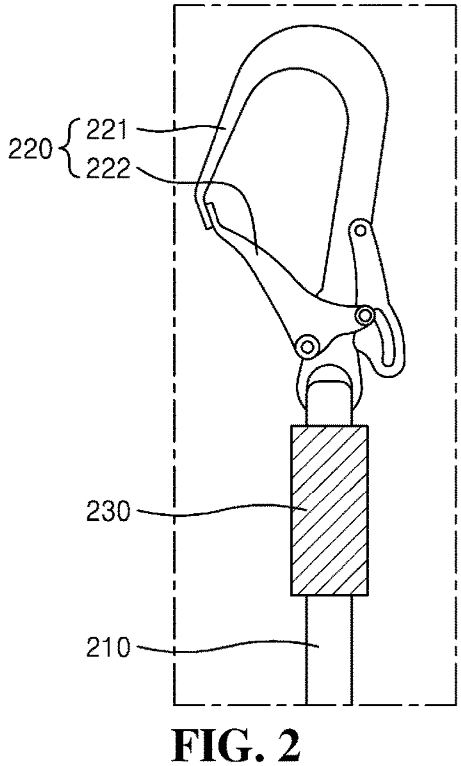
FIGS. 2 to 8 illustrate examples of a connecting rope, a safety hook, and a sensor device included in a safety belt according to an example embodiment.

FIG. 2 illustrates an example of the connecting rope 210, the safety hook 220, and the sensor device 230 included in the safety belt 200 according to an example embodiment. In the following, repeated description related to the description made above with reference to FIG. 1 is omitted. Herein, the safety hook 220 may include a hook 221 to which the safety equipment is fastened and an opening-and-closing portion 222 that may be opened and closed such that the safety equipment may be fastened to the hook 221.

Referring to FIG. 2, the sensor device 230 may be provided to the connecting rope 210 connected to the hook 221. An input terminal of a second sensor unit (232 of FIG. 9) as a touch sensor provided in the sensor device 230 may be connected to a metal body of the hook 221. The sensor device 230 may be configured to react in response to a touch of a body (e.g., a hand, etc.) of the worker on the hook 221. Here, the entire safety hook 220 configured as a metal body may be an input terminal of the second sensor unit (232 of FIG. 9).

Figure 3:
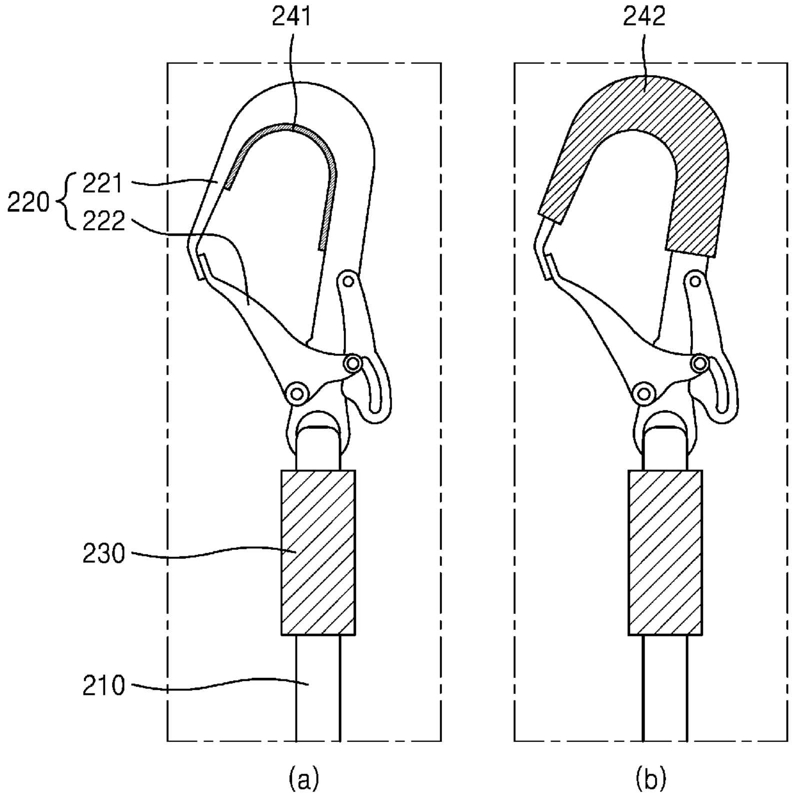

FIG. 3 illustrates another example of the connecting rope 210, the safety hook 220, and the sensor device 230 included in the safety belt 200 according to an example embodiment. In the following, repeated description related to the description made above with reference to FIGS. 1 and 2 is omitted. Referring to FIG. 3, the hook 221 of FIG. 2 configured to be in contact with the safety equipment is formed using insulators (241 and 242). This is to improve fastening characteristics of the safety hook 220. The safety hook 220 may be used by hanging it on the safety equipment in the industrial field. Meanwhile, in the case of using the hook 221 of the safety hook 220 as an input terminal of the second sensor unit (232 of FIG. 9) to fasten the safety hook 220 to the safety equipment formed of a metal body, a malfunction may occur. Therefore, to improve this, the hook 221 and the metal body of the safety equipment may be configured to not come into direct contact.

Therefore, referring to (a) of FIG. 3, the insulating tape 241 may be attached to the hook 221 in contact with the safety equipment. Alternatively, referring to (b) of FIG. 3, the hook 221 in contact with the safety equipment may be wrapped with the insulating tube 242.

Figure 4:
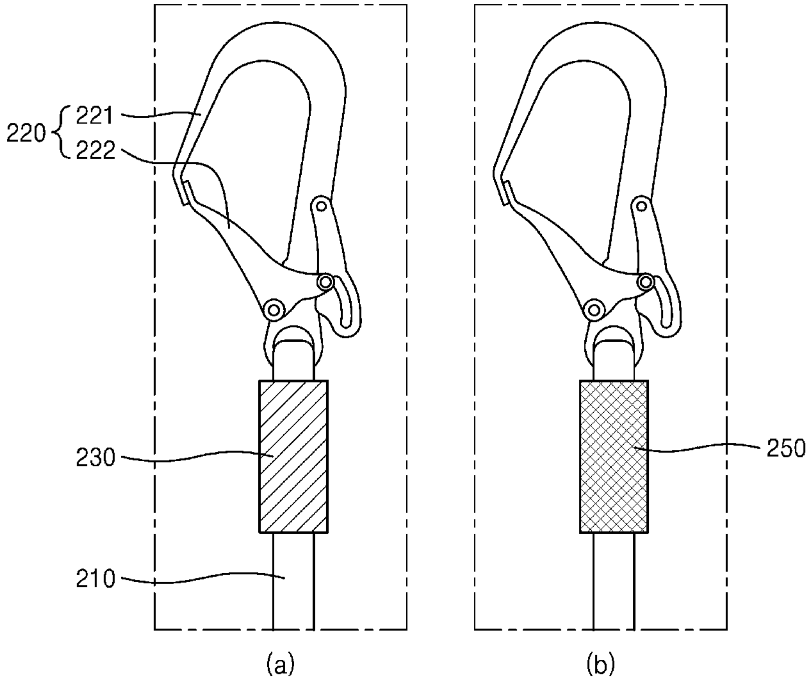

FIG. 4 illustrates another example of the connecting rope 210, the safety hook 220, and the sensor device 230 included in the safety belt 200 according to an example embodiment. In the following, repeated description related to the description made above with reference to FIGS. 1 to 3 is omitted. Referring to (a) of FIG. 4, the sensor device 230 may be installed in a portion of the connecting rope 210 connected to the hook 221. Referring to (b) of FIG. 4, a thin metal body 250 may be attached to another portion of the connecting rope 210. The input terminal of the second sensor unit (232 of FIG. 9) as a touch sensor provided in the sensor device 230 may be connected to the thin metal body 250 attached to the other portion of the connecting rope 210. The sensor device 230 may be configured to react in response to a touch of a body (e.g., a hand, etc.) of the worker on the thin metal body 250. Herein, the thin metal body 250 may be the input terminal of the second sensor unit (232 of FIG. 9).

Figure 5:
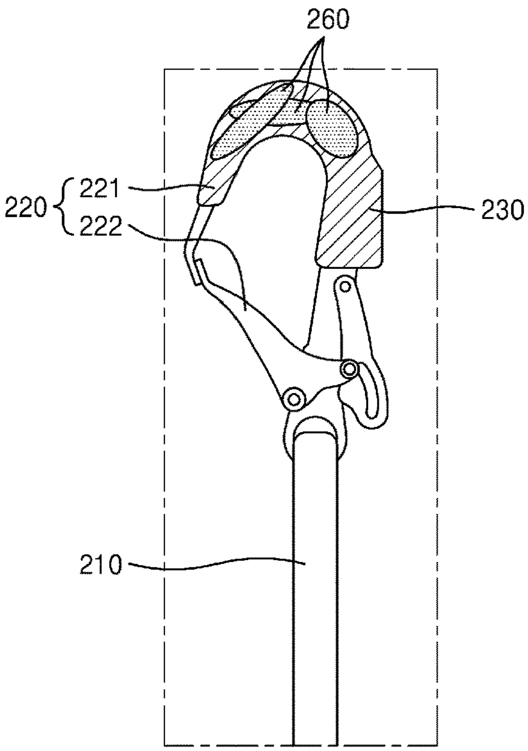

FIG. 5 illustrates another example of the connecting rope 210, the safety hook 220, and the sensor device 230 included in the safety belt 200 according to an example embodiment. In the following, repeated description related to the description made above with reference to FIGS. 1 to 4 is omitted. Referring to FIG. 5, the hook 221 of the safety hook 220 and the sensor device 230 may be connected as one and a thin metal body 260 may be widely installed on an upper portion of the sensor device 230, that is, a case portion. The input terminal of the second sensor unit (232 of FIG. 9) as the touch sensor provided in the sensor device 230 may be connected to the thin metal body 260. The sensor device 230 may be configured to react in response to a touch of a body (e.g., a hand, etc.) of the worker on the thin metal body 260. Herein, the thin metal body 260 may be the input terminal of the second sensor unit (232 of FIG. 9).

Figure 6:
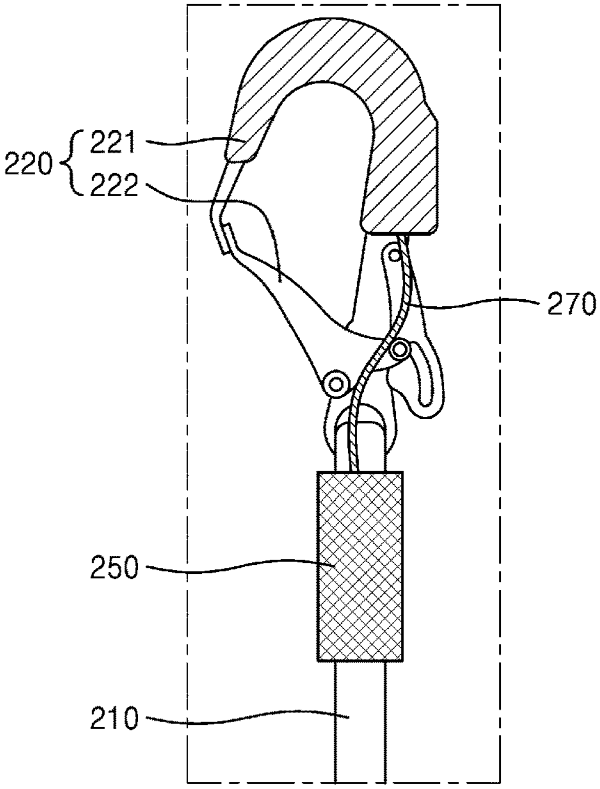

FIG. 6 illustrates another example of the connecting rope 210, the safety hook 220, and the sensor device 230 included in the safety belt 200 according to an example embodiment. In the following, repeated description related to the description made above with reference to FIGS. 1 to 5 is omitted. Referring to FIG. 6, the hook 221 of the safety hook 220 and the sensor device 230 may be connected as one and the thin metal body 250 may be installed on a portion of the connecting rope 210. Also, the sensor device 230 and the thin metal body 250 may be electrically connected through a metal body connecting wire 270. The input terminal of the second sensor unit (232 of FIG. 9) as the touch sensor provided in the sensor device 230 may be connected to the metal body connecting wire 270. The sensor device 230 may be configured to react through the metal body connecting wire 270 in response to a touch of a body (e.g., a hand, etc.) of the worker on the thin metal body 250. Herein, the thin metal body 250 may be the input terminal of the second sensor unit (232 of FIG. 9).

Figure 7:
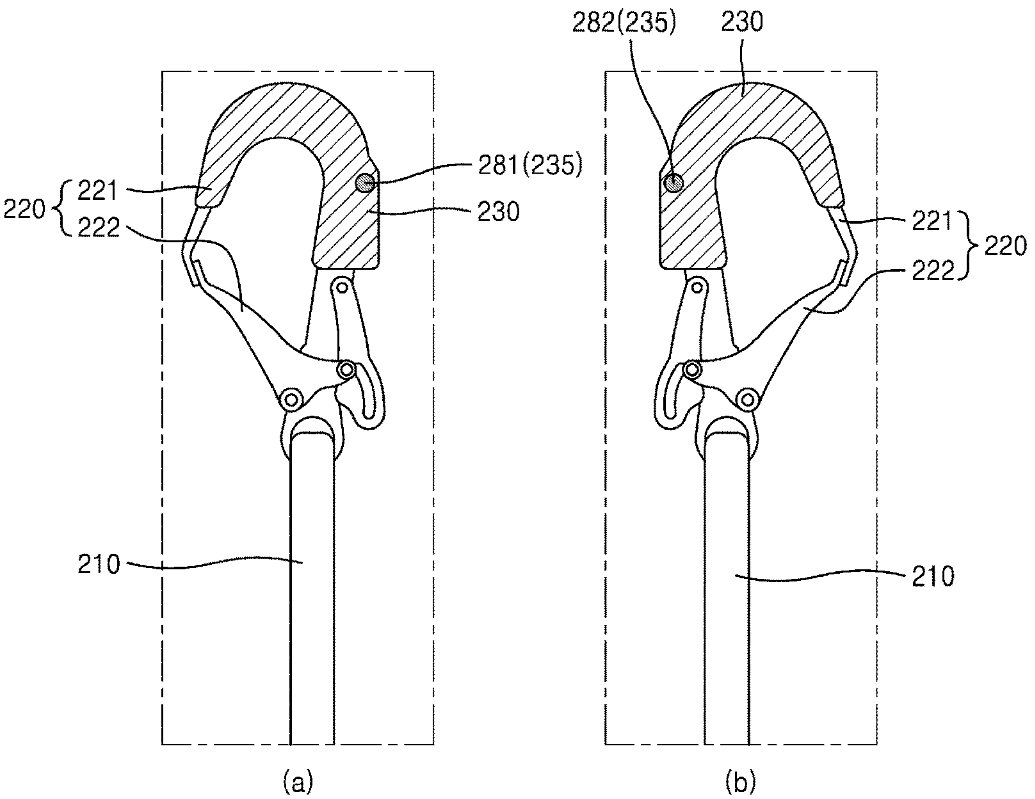

FIG. 7 illustrates another example of the connecting rope 210, the safety hook 220, and the sensor device 230 included in the safety belt 200 according to an example embodiment. In the following, repeated description related to the description made above with reference to FIGS. 1 to 6 is omitted. FIG. 7 illustrates an example of installing a fifth sensor unit (235 of FIG. 9) as an infrared ray (IR) sensor in a configuration of FIG. 5. Referring to (a) of FIG. 7, one 281 of fifth sensor units (231 of FIG. 9) as the IR sensor provided in the sensor device 230 may be installed in a first direction of the safety hook 220. By installing such fifth sensor units 281 and 282 (235 of FIG. 9), presence or absence of an object around the safety hook 220 may be detected. Also, referring to (b) of FIG. 7, another one 282 of the fifth sensor units (235 of FIG. 9) may be installed in a second direction of the safety hook 220. In this example, the second direction may be different from the first direction by 180 degrees. That is, if the first direction faces the body of the worker, the second direction may be 180 degrees opposite to the first direction. As shown in (a) or (b) of FIG. 7, the fifth sensor unit 281 or 282 (235 of FIG. 9) configured as one may detect presence or absence of the object around the safety hook 220. Alternatively, as shown in (a) and (b) of FIG. 7, two fifth sensor units 281 and 282 (235 of FIG. 9) may detect presence or absence of the object around the safety hook 220 and may detect whether the safety hook 220 is fastened to the safety equipment.

Figure 8:
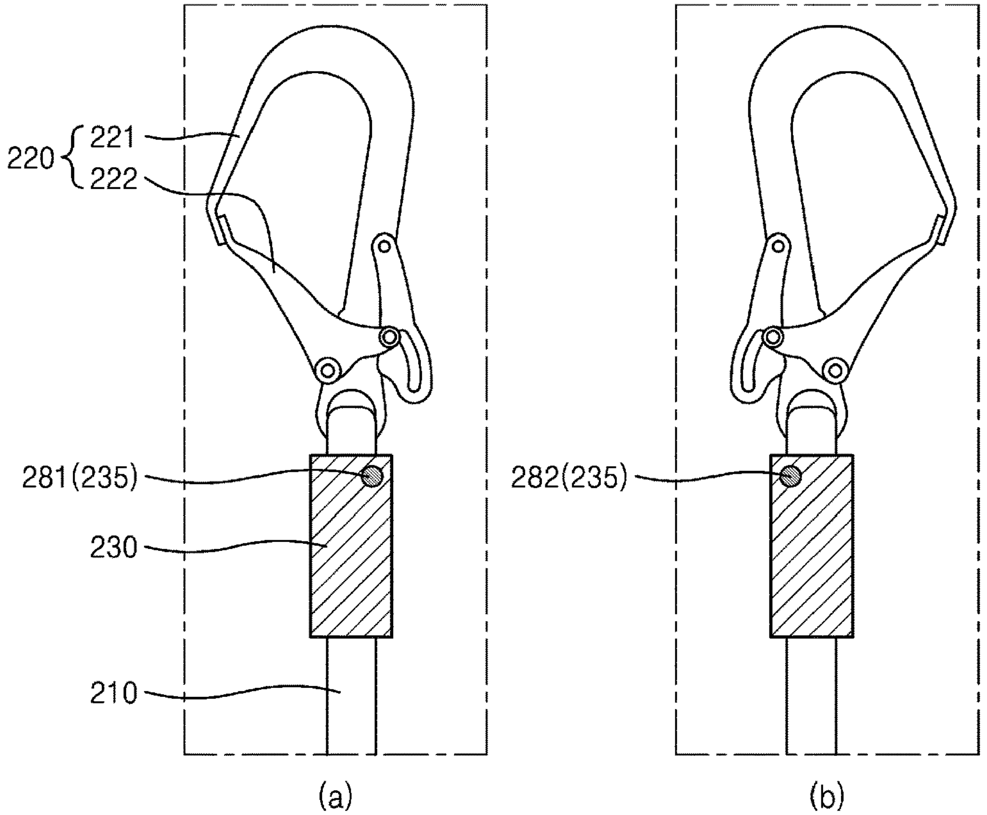

FIG. 8 illustrates another example of the connecting rope 210, the safety hook 220, and the sensor device 230 included in the safety belt 200 according to an example embodiment. In the following, repeated description related to the description made above with reference to FIGS. 1 to 7 is omitted. FIG. 8 illustrates an example of installing the fifth sensor unit (235 of FIG. 9) as an IR sensor in the configuration of FIG. 2. Related description is the same as that of FIG. 7 and thus, is omitted.

Although an example of detecting whether the safety hook 220 is fastened to the safety equipment through the second sensor unit (232 of FIG. 9) as the touch sensor provided to the sensor device 230 and the fifth sensor unit (235 of FIG. 9) as the IR sensor is described herein, whether the safety hook 220 is fastened to the safety equipment may be detected through pressure detection using a fourth sensor unit (234 of FIG. 9) as a pressure sensor provided to the sensor device 230. Also, whether the safety hook 220 is fastened to the safety equipment may be detected through a hole sensor (not shown) provided to the sensor device 230. The hole sensor may detect whether the safety hook 220 is fastened to the safety equipment by recognizing a change in current according to a distance from a magnet. Referring to FIGS. 5 and 6, when pressure is applied to the safety hook 220, a distance between the sensor device 230 and the hook 221 may decrease. Therefore, the magnet and the hole sensor may become closer. When the magnet and the hole sensor become closer, more current flows and voltage increases accordingly and the safety management apparatus 100 may determine that the safety hook 220 is fastened to the safety equipment. Here, the magnet and the hole sensor may be structurally stably provided to the sensor device 230 and thereby used.

Figure 9:
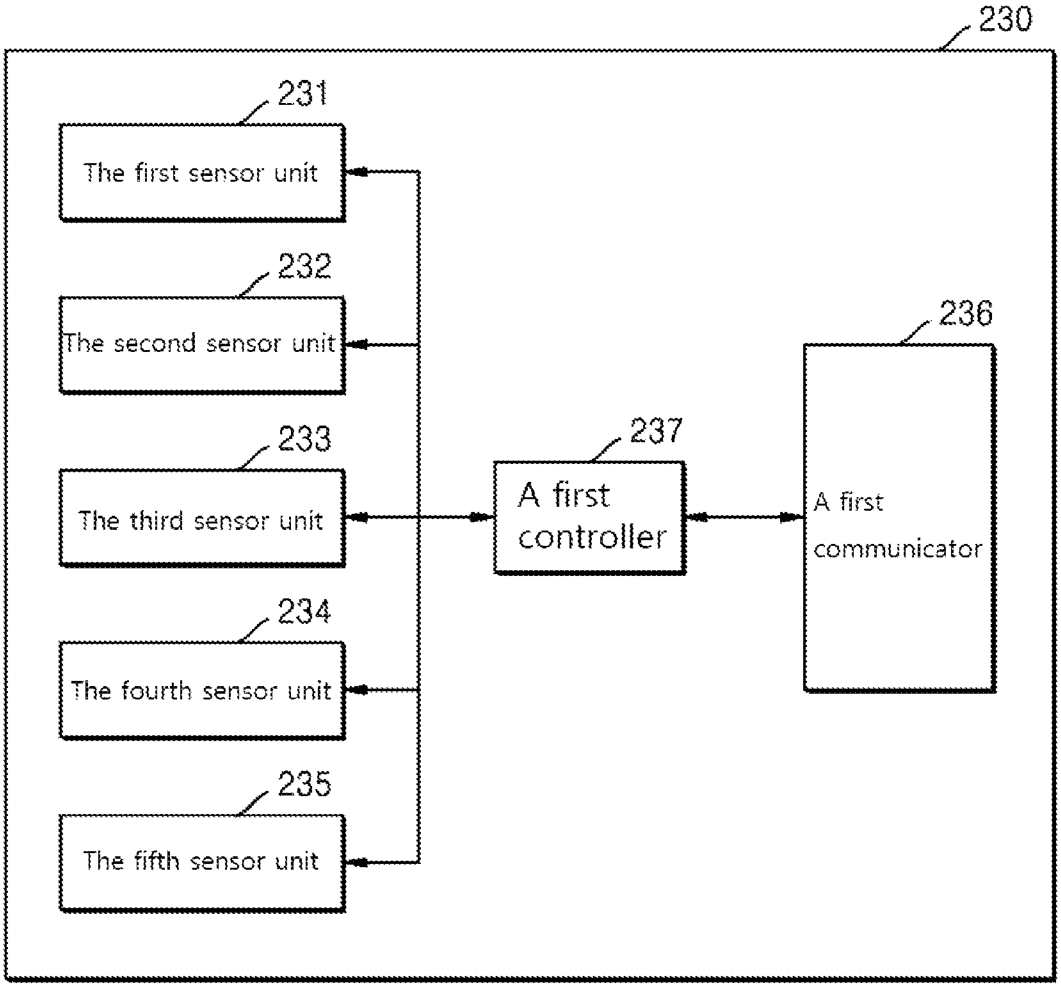
FIG. 9 is a diagram illustrating an example of a configuration of a sensor device according to an example embodiment.

FIG. 9 is a block diagram illustrating an example of a configuration of a sensor device according to an example embodiment. In the following, repeated description related to the description made above with reference to FIGS. 1 to 8 is omitted. Referring to FIG. 9, the sensor device 230 may include the first sensor unit 231, the second sensor unit 232, the third sensor unit 233, the fourth sensor unit 234, the fifth sensor unit 235, a first communicator 236, and a first controller 237. Herein, at least one of the first sensor unit 231 to the fifth sensor unit 235 may be provided to the sensor device 230 depending on example embodiments.

The first sensor unit 231 may include an altitude sensor capable of detecting altitude of the worker. The first sensor unit 231 may detect the altitude of the worker and may generate a first detection signal.

The second sensor unit 232 may include a touch sensor capable of detecting a touch of the connecting rope 210 or the safety hook 220. The second sensor unit 232 may detect a touch of the worker and may generate a second detection signal.

The third sensor unit 233 may include a motion detection sensor capable of detecting a movement of the safety hook 220. The third sensor unit 233 may detect the movement of the safety hook 220 and may generate a third detection signal.

The fourth sensor unit 234 may include a pressure sensor configured to detect a pressure when fastening the safety hook 220 to the safety equipment. The fourth sensor unit 234 may detect the pressure when fastening the safety hook 220 to the safety equipment and may generate a fourth detection signal.

The fifth sensor unit 235 may include an IR sensor capable of detecting presence or absence of an object around the safety hook 220. The fifth sensor unit 235 may detect the presence or the absence of the object around the safety hook 220 and may generate a fifth detection signal. Here, being around the safety hook 220 may specify, for example, a distance of 10 cm away from the safety hook 220.

The first communicator 236 may transmit, to the safety management apparatus 100 and/or the worker terminal 300 over the network 400, the first detection signal generated by the first sensor unit 231 to the fifth detection signal generated by the fifth sensor unit 235.

The first controller 237 may control an overall operation of the sensor device 230. The first controller 237 may control at least one of the first sensor unit 231 to the fifth sensor unit 235 to periodically operate. The first controller 237 may control the first communicator 236 such that the first detection signal generated by the first sensor unit 231 to the fifth detection signal generated by the fifth sensor unit 235 may be transmitted to the safety management apparatus 100 and/or the worker terminal 300 through the network 400.

Figure 10:
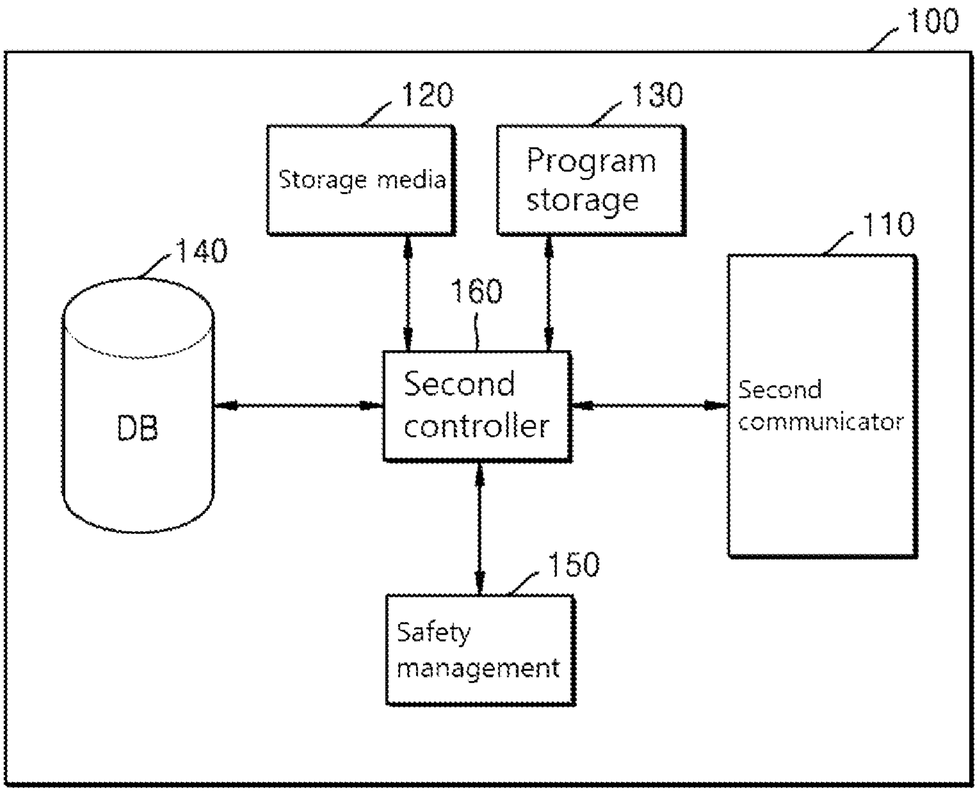
FIG. 10 is a diagram illustrating an example of a configuration of a safety management apparatus according to an example embodiment.

FIG. 10 is a diagram illustrating an example of a configuration of a safety management apparatus according to an example embodiment, and FIG. 11 illustrates an example of determining a risk level of a worker according to an example embodiment. In the following, repeated description related to the description made above with reference to FIGS. 1 to 9 is omitted. Referring to FIGS. 10 and 11, the safety management apparatus 100 may include a second communicator 110, a storage media 120, a program storage 130, a database (DB) 140, a safety management unit 150, and a second controller 160.

The second communicator 110 may provide a communication interface necessary to provide signals transmitted and received among the safety management apparatus 100, the sensor device 230, and the worker terminal 300 in a form of packet data through interaction with the network 400. Also, the second communicator 110 may serve to receive a predetermined information request signal from the safety management apparatus 100 and/or the worker terminal 300 and to transmit information processed by the safety management unit 150 to the safety management apparatus 100 and/or the worker terminal 300. Here, the communication network refers to a medium that serves to connect the safety management apparatus 100, the sensor device 230, and/or the worker terminal 300 to each other and may include a path for providing an access path such that the worker terminal 300 may access the safety management apparatus 100 and then transmit and receive information. Also, the second communicator 110 may be a device that includes hardware and software required to transmit and receive a signal, such as a control signal or a data signal, through wired/wireless connection to another network device.

The storage media 120 may perform the functionality of temporarily or permanently storing data processed by the second controller 160. Here, although the storage media 120 may include magnetic storage media or flash storage media, the scope of the present disclosure is not limited thereto. The storage media 120 may include an internal memory and/or an external memory; a volatile memory such as dynamic random access memory (DRAM), static RAM (SRAM), or synchronous dynamic RAM (SDRAM); a nonvolatile memory such as one time programmable read only memory (OTPROM), PROM, erasable PROM (EPROM), electrically erasable PROM (EEPROM), mask ROM, flash ROM, NAND flash memory, or a NOR flash memory; a flash drive such as a solid state drive (SSD), a compact flash (CF) card, a secure digital (SD) card, a Micro-SD card, a Mini-SD card, an Xd card, or a memory stick; and a storage device such as HDD.

The program storage 130 is equipped with control software configured to perform an operation of determining whether the safety hook 220 connected through the connecting rope 210 provided to the safety belt 200 worn by the worker is fastened to the safety equipment, an operation of generating an alarm signal and transmitting the alarm signal to the worker terminal 300 when it is determined that the safety hook 220 is unfastened to the safety equipment, an operation of loading a first score set in response to whether the safety hook 220 is fastened to the safety equipment and a second score set in response to a duration of a state in which the safety hook 220 is unfastened to the safety equipment, an operation of receiving a first detection signal to a fifth detection signal from the first sensor unit 231 to the fifth sensor unit 235 provided to the sensor device 230, an operation of loading a third score set in response to the first detection signal of detecting altitude of an worksite in which the worker is working from the first sensor unit 231, an operation of determining a risk stage of the worker from a summation result of the first score, the second score, and the third score, and an operation of generating an alarm signal corresponding to the risk stage of the worker and transmitting the alarm signal to the worker terminal 300.

The database 140 may include a management database configured to store types of sensor units provided to the sensor device 230 and specification information on each of the sensor units. Also, the management database may store score information ((a) of FIG. 11) that includes the first score set in response to whether the safety hook 220 is fastened to the safety equipment, the second score set in response to the duration of the state in which the safety hook 220 is unfastened to the safety equipment, and the third score set in response to the first detection signal. Also, the management database may store five stages of risk levels ((b) of FIG. 11) that include a safe stage, a stage of concern, a stage of caution, a stage of vigilance, and a serious stage according to the summation result of the first score, the second score, and the third score. Also, the management database may store a risk level analysis prediction algorithm capable of predicting a risk level of the worker.

Also, the database 140 may include a user database configured to store information of a worker to be provided with a safety management service. Here, information of the worker may include basic information of the worker, for example, a name, affiliation, personal information, gender, age, contact, email, address, and an image of the worker, and access related information, for example, information on an authentication of the worker (login) such as an ID (or email) and a password, access country, an access location, information on a device used for access, and an accessed network environment.

Also, the user database may store unique information of the worker, information provided to the worker connected to a safety management application or an amplifier design site, and/or category history, environment setting information set by the worker, resource usage information used by the worker, and charge and payment information corresponding to resource usage of the worker.

The safety management unit 150 may determine whether the safety hook 220 connected through the connecting rope 210 provided to the safety belt 200 worn by the worker is fastened to the safety equipment.

In an example embodiment, referring to FIGS. 2 and 3, the safety management unit 150 may receive, from the second sensor unit 232 provided to the connecting rope 210, a second detection signal of detecting whether the hook 221 constituting the safety hook 220 is touched.

In an example embodiment, in regard to receiving the second detection signal, referring to FIG. 4, the safety management unit 150 may receive, from the second sensor unit 232 provided to the connecting rope 210, the second detection signal of detecting whether the thin metal body 250 attached to the connecting rope 210 is touched.

In another example embodiment, in regard to receiving the second detection signal, referring to FIG. 5, the safety management unit 150 may attach the thin metal body 260 on a top surface of the sensor device 230 coupled to the hook 221 and including the second sensor unit 232, that is, a case, and may receive the second detection signal of detecting a touch of the thin metal body 260 from the second sensor unit 232.

In another example embodiment, in regard to receiving the second detection signal, referring to FIG. 6, the safety management unit 150 may receive, from the second sensor unit 232 coupled to the hook 221, the second detection signal of detecting whether the thin metal body 250 attached to the connecting rope 210 is touched through the metal body connecting wire 270.

When the second detection signal is received for a reference time (e.g., 3 seconds) or more, the safety management unit 150 may determine that the safety hook 220 is unfastened to the safety equipment. When the second detection signal is received for less than the reference time, the safety management unit 150 may determine that the safety hook 220 is fastened to the safety equipment.

In another example embodiment, referring to FIG. 7, when determining whether the safety hook 220 is fastened to the safety equipment, the safety management unit 150 may receive a fifth detection signal of detecting presence or absence of an object around the safety hook 220 from the fifth sensor unit 235 provided in a first direction of the hook 221 constituting the safety hook 220. Also, referring to FIG. 8, when determining whether the safety hook 220 is fastened to the safety equipment, the safety management unit 150 may receive the fifth detection signal of detecting the presence or the absence of the object around the safety hook 220 from the fifth sensor unit 235 provided in a first direction of the connecting rope 210. The safety management unit 150 may determine that the safety hook 220 is fastened to the safety equipment when no object is detected around the safety hook 220 and may determine that the safety hook 220 is fastened to the safety equipment when the object is detected around the safety hook 220, based on the fifth detection signal.

When it is determined that the safety hook 220 is unfastened to the safety equipment, the safety management unit 150 may generate an alarm signal and may transmit the alarm signal to the worker terminal 300. Herein, the alarm signal may include at least one of a light emitting diode (LED) display signal (visual signal) and/or a boozer signal (auditory signal) and/or a vibration signal (tactile signal).

In an example embodiment, when the second detection signal is received for a reference time (e.g., 3 seconds) or more, the safety management unit 150 may determine that the safety hook 220 is unfastened to the safety equipment. When the second detection signal is received for less than the reference time, the safety management unit 150 may determine that the safety hook 220 is fastened to the safety equipment and then may receive a third detection signal of detecting a movement of the safety hook 220 from the third sensor unit 233. Based on the third detection signal, the safety management unit 150 may firmly determine that the safety hook 220 is fastened to the safety equipment when the movement of the safety hook 220 satisfies a reference value and may firmly determine that the safety hook 220 is unfastened to the safety equipment when a movement detection result of the safety hook 220 does not satisfy the reference value. Here, that the movement of the safety hook 220 satisfies the reference value may include a case in which a movement time and/or a speed of the safety hook 220 is greater than or equal to a reference time (e.g., 5 seconds) or greater than or equal to a reference speed (e.g., 4 km/h).

In another example embodiment, when a fourth detection signal of detecting a pressure of the safety hook 220 is received from the fourth sensor unit 234 after determining that the safety hook 220 is unfastened to the safety equipment since the second detection signal is received for less than the reference time (e.g., 3 seconds), the safety management unit 150 may firmly determine that the safety hook 220 is unfastened to the safety equipment. However, the safety management unit 150 may determine that the worker is griping the safety hook 220 when the fourth detection signal is not received from the fourth sensor unit 234 and may firmly determine that the worker is gripping the safety hook 220 when the fourth detection signal is not received for a preset period of time (e.g., 3 seconds) and may firmly determine that the safety hook 220 is unfastened to the safety equipment. When the fourth detection signal is received from the fourth sensor unit 234 after determining that the safety hook 220 is fastened to the safety equipment since the second detection signal is received for the reference time (e.g., 3 seconds) or more, the safety management unit 150 may firmly determine that the safety hook 220 is fastened to the safety equipment. However, when the fourth detection signal is not received from the fourth sensor unit 234, the safety management unit 150 may determine that the fourth sensor unit 234 is out of order.

In another example embodiment, after determining that the safety hook 220 is unfastened to the safety equipment since the second detection signal is received for less than the reference time (e.g., 3 seconds), the safety management unit 150 may receive a fifth detection signal of detecting presence or absence of an object around the safety hook 220 from the fifth sensor unit 235 provided in the first direction of the hook 221 constituting the safety hook 220 and may firmly determine that the safety hook is unfastened to the safety equipment when the object is detected around the safety hook 220 based on the fifth detection signal. However, based on the fifth detection signal, the safety management unit 150 may determine that the worker is gripping the safety hook 220 when no object is detected around the safety hook 220 and may firmly determine that the worker is gripping the safety hook 220 when no object is detected around the safety hook 220 for a preset period of time (e.g., 3 seconds) and may firmly determine that the safety hook 220 is unfastened to the safety equipment. After determining that the safety hook 220 is fastened to the safety equipment since the second detection signal is received for less than the reference signal (e.g., 3 seconds), the safety management unit 150 may receive the fifth detection signal of detecting the presence or absence of the object around the safety hook 220 from the fifth sensor unit 235 provided in the first direction of the hook 221 and may firmly determine that the safety hook 220 is fastened to the safety equipment since no object is detected around the safety hook 220 based on the fifth detection signal. However, when the object is detected around the safety hook 220 based on the fifth detection signal, the safety management unit 150 may determine that the fifth sensor unit 235 is out of order.

In another example embodiment, when the fourth detection signal of detecting pressure of the safety hook 220 is received from the fourth sensor unit 234 after determining that the safety hook 220 is unfastened to the safety equipment since the second detection signal is received for less than the reference time (e.g., 3 seconds), the safety management unit 150 may firmly determine that the safety hook 220 is unfastened to the safety equipment. However, when the fourth detection signal is not received from the fourth sensor unit 234, the safety management unit 150 may determine that the worker is gripping the safety hook 220. When the fourth detection signal is not received for the preset period of time (e.g., 3 seconds), the safety management unit 150 may firmly determine that the worker is gripping the safety hook 220 and may firmly determine that the safety hook 220 is unfastened to the safety equipment. When the fourth detection signal is received from the fourth sensor unit 234 after determining that the safety hook 220 is fastened to the safety equipment since the second detection signal is received for the reference time (e.g., 3 seconds) or more, the safety management unit 150 may firmly determine that the safety hook 220 is fastened to the safety equipment. However, when the fourth detection signal is not received from the fourth sensor unit 234, the safety management unit 150 may receive a fifth detection signal of detecting presence or absence of the object around the safety hook 220 from the fifth sensor unit 235 provided in the first direction of the hook constituting the safety hook 220. Here, when no object is detected around the safety hook 220 based on the fifth detection signal, the safety management unit 150 may firmly determine that the safety hook 220 is fastened to the safety equipment. However, when the object is detected around the safety hook 220 based on the fifth detection signal, the safety management unit 150 may determine that the fifth sensor unit 235 is out of order.

The safety management unit 150 may load a first score set in response to whether the safety hook 220 is fastened to the safety equipment and a second score set in response to a duration of a state in which the safety hook 220 is unfastened to the safety equipment, according to a result of firmly determining whether the safety hook 220 is fastened to the safety equipment.

(a) of FIG. 11 illustrates an example of a first score differently set in response to a fastening or unfastening status of the safety hook 220. For example, when the safety hook 220 is fastened to the safety equipment, 0 points may be set, when the safety hook 220 is unfastened to the safety equipment, 5 points may be set, and when the safety hook 220 is poorly fastened to the safety equipment, 5 points may be set.

Also, (a) of FIG. 11 illustrates an example of a second score set in response to a duration of a state in which the safety hook 220 is unfastened to the safety equipment. For example, when the safety hook 220 is unfastened to the safety equipment for less than 3 seconds, 1 point may be set, when the safety hook 220 is unfastened to the safety equipment for 3 to less than 5 seconds, points may be set, and when the safety hook 220 is unfastened to the safety equipment for 5 seconds or more, 25 points may be set.

The safety management unit 150 may receive, from the first sensor unit 231, a first detection signal of detecting altitude of a worksite in which the worker is working and may load a third score set in response to the first detection signal.

(a) of FIG. 11 illustrates an example of a third score set in response to an altitude of a worksite in which the worker is working. For example, when the worker is working in a worksite with an altitude of 1 m or less, 3 points may be set, when the worker is working in a worksite with an altitude of between 1 and 2 m, 5 points may be set, and when the worker is working in a worksite with an altitude of 2 m or more, 10 points may be set.

The safety management unit 150 may determine a risk level of the worker from a summation result of the first score, the second score, and the third score. Herein, the risk level may include at least one of five stages of risk levels including a safe stage, a stage of concern, a stage of caution, a stage of vigilance, and a serious stage according to the summation result of the first score, the second score, and the third score.

(b) of FIG. 11 illustrates a risk level according to the summation result of the first score, the second score, and the third score. For example, if the summation result of the first score, the second score, and the third score is less than 10 points, the risk level may be a safe stage. If the summation result of the first score, the second score, and the third score is between 10 and 20 points, the risk level may be a stage of concern. If the summation result of the first score, the second score, and the third score is between 20 and 30 points, the risk level may be a stage of caution. If the summation result of the first score, the second score, and the third score is between and 40 points, the risk level may be a stage of vigilance. If the summation result of the first score, the second score, and the third score is greater or equal to 40 points, the risk level may be a serious (accident) stage.

The safety management unit 150 may generate an alarm signal corresponding to one of five stages of risk levels and may transmit the alarm signal to the worker terminal 300. The safety management unit 150 may generate different alarm signals according to the safe stage, the stage of concern, the stage of caution, the stage of vigilance, and the serious (accident) stage, and may transmit the generated alarm signal to the worker terminal 300.

When the worker well observes a risk level of the safe stage, the safety management unit 150 may provide a reward (discount of insurance fee, incentives, etc.).

The second controller 160 may refer to a type of a central processing device and may control the overall operation of the safety management apparatus 100 by driving control software loaded to the program storage 130. The second controller 160 may include any type of devices capable of processing data, such as a processor. Here, the processor may represent a data processing device embedded in hardware, having a physically structured circuit to perform a function represented as a code or an instruction included in a program. Examples of the data processing device embedded in hardware may include a microprocessor, a central processing unit (CPU), a processor core, a multiprocessor, an application-specific integrated circuit (ASIC), and a field programmable gate array (FPGA). However, the scope of the present invention is not limited thereto.

Figure 12:
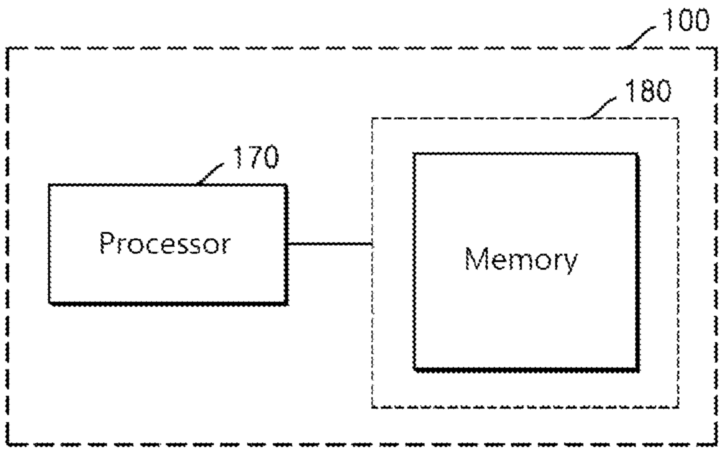
FIG. 12 is a diagram illustrating another example of a configuration of a safety management apparatus according to an example embodiment.

FIG. 12 is a diagram illustrating another example of a configuration of a safety management apparatus according to an example embodiment. In the following, repeated description related to the description made above with reference to FIGS. 1 to 11 is omitted. Referring to FIG. 12, the safety management apparatus 100 according to another example embodiment may include a processor 170 and a memory 180.

Herein, the processor 170 may process functions performed by the second communicator 110, the storage media 120, the program storage 130, the database 140, the safety management unit 150, and the second controller 160 of FIG. 10.

The processor 170 may control the overall operation of the safety management apparatus 100. Here, the processor may represent a data processing device embedded in hardware, having a physically structured circuit to perform a function represented as a code or an instruction included in a program. Examples of the data processing device embedded in hardware may include a microprocessor, a CPU, a processor core, a multiprocessor, an ASIC, and an FPGA. However, the scope of the present disclosure is not limited thereto.

The memory 180 may be operatively connected to the processor 170 and may store at least one code in association with an operation performed by the processor 170.

Also, the memory 180 may perform the functionality of temporarily or permanently storing data processed by the processor 170, and may include data constructed as the database 140. Here, although the memory 180 may include magnetic storage media or flash storage media, the scope of the present invention is not limited thereto. The memory 180 may include an internal memory and/or an external memory; a volatile memory such as DRAM, SRAM, or SDRAM; a nonvolatile memory such as one time programmable ROM (OTPROM), PROM, EPROM, EEPROM, mask ROM, flash ROM, NAND flash memory, or a NOR flash memory; a flash drive such as an SSD, a compact flash (CF) card, a secure digital (SD) card, a Micro-SD card, a Mini-SD card, an Xd card, or a memory stick; and a storage device such as HDD.

Figure 13:
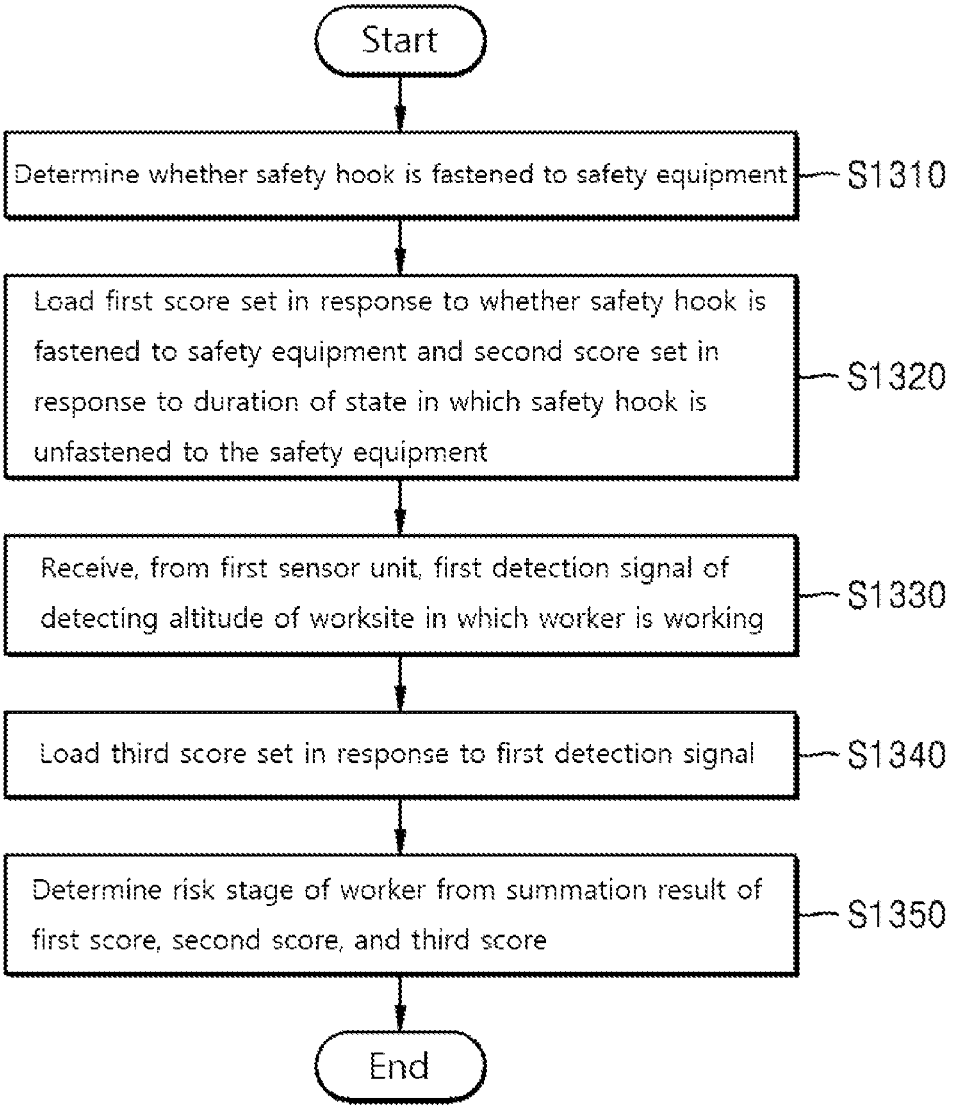
FIGS. 13 to 18 are flowchart illustrating examples of a safety management method of a worker according to an example embodiment.

FIG. 13 is a flowchart illustrating an example of a safety management method of a worker according to an example embodiment. In the following, repeated description related to the description made above with reference to FIGS. 1 to 12 is omitted here. Description is made with the assumption that the safety management method of the worker according to an example embodiment is performed by the safety management apparatus 100 at the processor 170 with the assistance of peripheral components.

Referring to FIG. 13, in operation S1310, the processor 170 may determine whether the safety hook 220 connected through the connecting rope 210 provided to the safety belt 200 worn by a worker is fastened to the safety equipment (e.g., safety rope, safety scaffold, etc.). Herein, to determine whether the safety hook 220 is fastened to the safety equipment, the processor 170 may receive sensing signals from the sensor units (e.g., 231 to 235 of FIG. 9) provided to the sensor device 230. Herein, when the safety hook 220 is unfastened to the safety equipment as a result of determining whether the safety hook 220 is fastened to the safety equipment, the processor 170 may generate an alarm signal for inducing the safety hook 220 to be fastened to the safety equipment and may transmit the alarm signal to the worker terminal 300.

In operation S1320, the processor 170 may load a first score set in response to whether the safety hook 220 is fastened to the safety equipment and a second score set in response to a duration of a state in which the safety hook 220 is unfastened to the safety equipment, according to a result of determining whether the safety hook 220 is fastened to the safety equipment.

In operation S1330, the processor 170 may receive a first detection signal of detecting an altitude of a work site in which the worker is working from the first sensor unit 231 provided to the sensor device 230.

In operation S1340, the processor 170 may load a third score set in response to the first detection signal.

In operation S1350, the processor 170 may determine a risk stage of the worker from a summation result of the first score, the second score, and the third score. The safety management apparatus 100 may determine one of five stages of risk levels including a safe stage, a stage of concern, a stage of caution, a stage of vigilance, and a serious stage according to the summation result of the first score, the second score, and the third score. The safety management apparatus 100 may generate an alarm signal corresponding to one of the five stages of risk levels and may transmit the alarm signal to the worker terminal 300.

Figure 14:
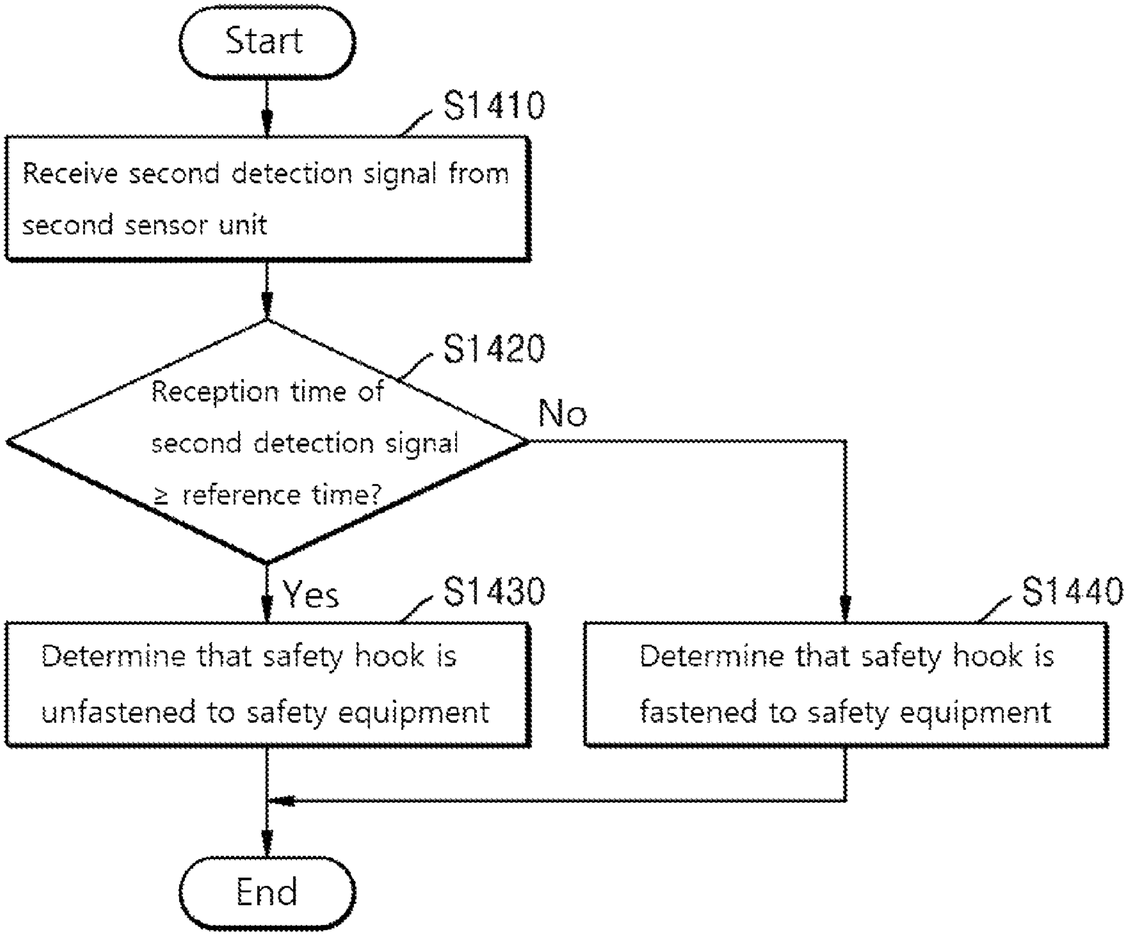

FIG. 14 is a flowchart illustrating an example of a method of determining whether a safety hook is fastened to a safety equipment according to an example embodiment. In the following, repeated description related to the description made above with reference to FIGS. 1 to 13 is omitted.

Referring to FIG. 14, in operation S1410, the processor 170 may receive a second detection signal from the second sensor unit 232. Example embodiments in which the processor 170 receives the second detection signal from the second sensor unit 232 are described above in detail and thus, further description related thereto is omitted.

In operation S1420, the processor 170 may determine whether the second detection signal is received for a reference time (e.g., 3 seconds) or more.

In operation S1430, when the second detection signal is received for the reference time (e.g., 3 seconds) or more, the processor 170 may determine that the safety hook 220 is unfastened to the safety equipment. Here, when the safety hook 220 is unfastened to the safety equipment, it may be a state in which a body of the worker continuously touches the safety hook 220 and the processor 170 may determine that the safety hook 220 is unfastened to the safety equipment accordingly.

In operation S1440, when the second detection signal is received for less than the reference signal (e.g., 3 seconds), the processor 170 may determine that the safety hook 220 is fastened to the safety equipment.

Figure 15:
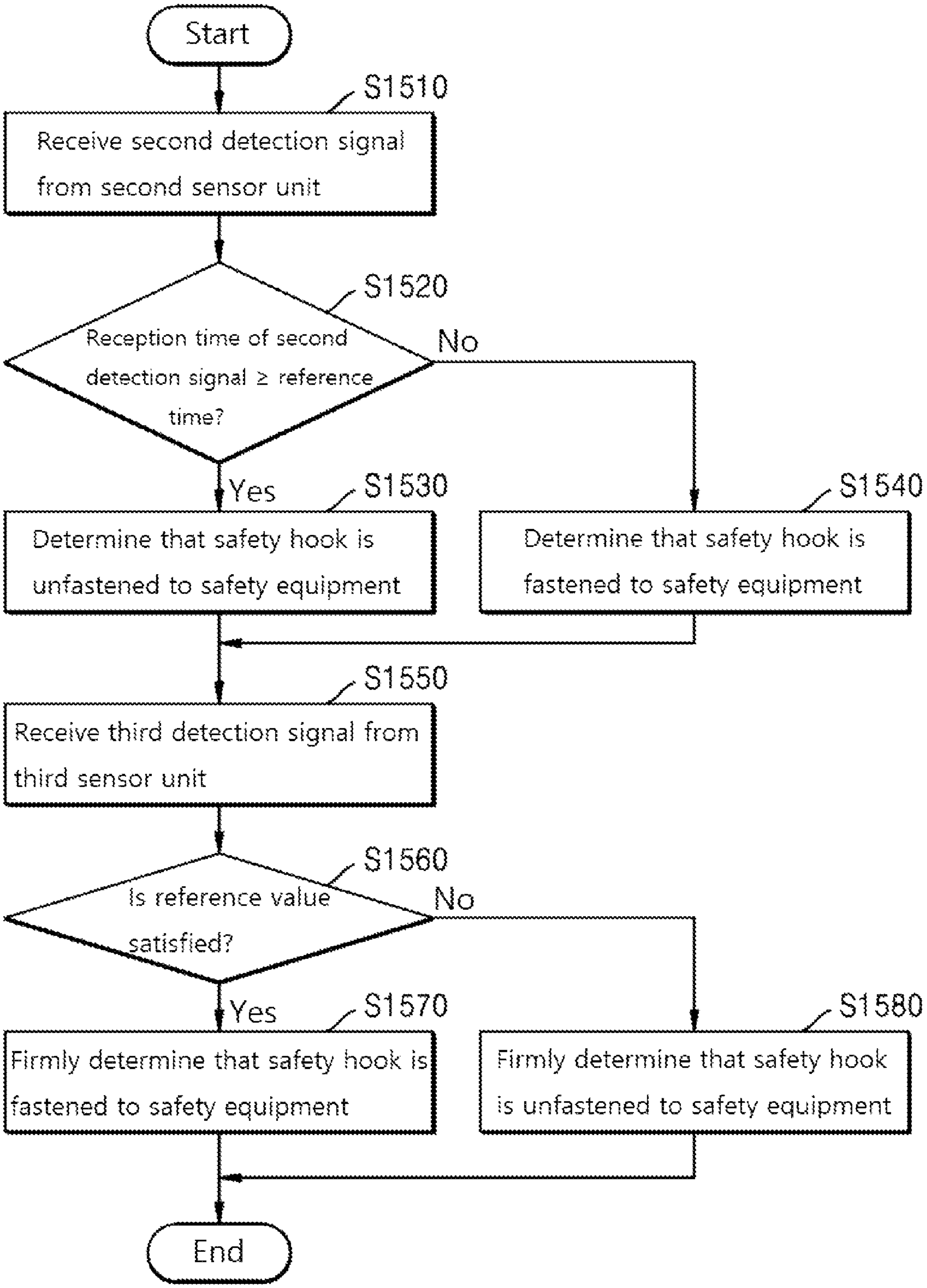

FIG. 15 is a flowchart illustrating another example of a method of determining whether a safety hook is fastened to a safety equipment according to an example embodiment. In the following, repeated description related to the description made above with reference to FIGS. 1 to 14 is omitted.

Referring to FIG. 15, in operation S1510, the processor 170 may receive a second detection signal from the second sensor unit 232.

In operation S1520, the processor 170 may determine that the second detection signal is received for a reference time (e.g., 3 seconds) or more.

In operation S1530, when the second detection signal is received for the reference time (e.g., 3 seconds) or more, the processor 170 may determine that the safety hook 220 is unfastened to the safety equipment.

In operation S1540, when the second detection signal is received for less than the reference time (e.g., 3 seconds), the processor 170 may determine that the safety hook 220 is fastened to the safety equipment.

In operation S1550, the processor 170 may receive, from the third sensor unit 233, a third detection signal of detecting a movement of the safety hook 220.

In operation S1560, the processor 170 may determine whether the movement of the safety hook 220 satisfies a reference value based on the third detection signal. Here, that the movement of the safety hook 220 satisfies the reference value may include a case in which a movement time and/or speed of the safety hook 220 is greater than or equal to a reference time (e.g., 5 seconds) or a reference speed (e.g., 4 km/h) or more.

In operation S1570, when the movement of the safety hook 220 satisfies the reference value based on the third detection signal, the processor 170 may firmly determine that the safety hook 220 is fastened to the safety equipment. Here, when the safety hook 220 is fastened to the safety equipment, work of the worker moves the body of the worker and the safety hook 220 comes into a mobile state accordingly. Therefore, the processor 170 may determine that the safety hook 220 is fastened to the safety equipment.

In operation S1580, when a movement detection result of the safety hook 220 does not satisfy the reference value, the processor 170 may firmly determine that the safety hook 220 is unfastened to the safety equipment.

Figure 16:
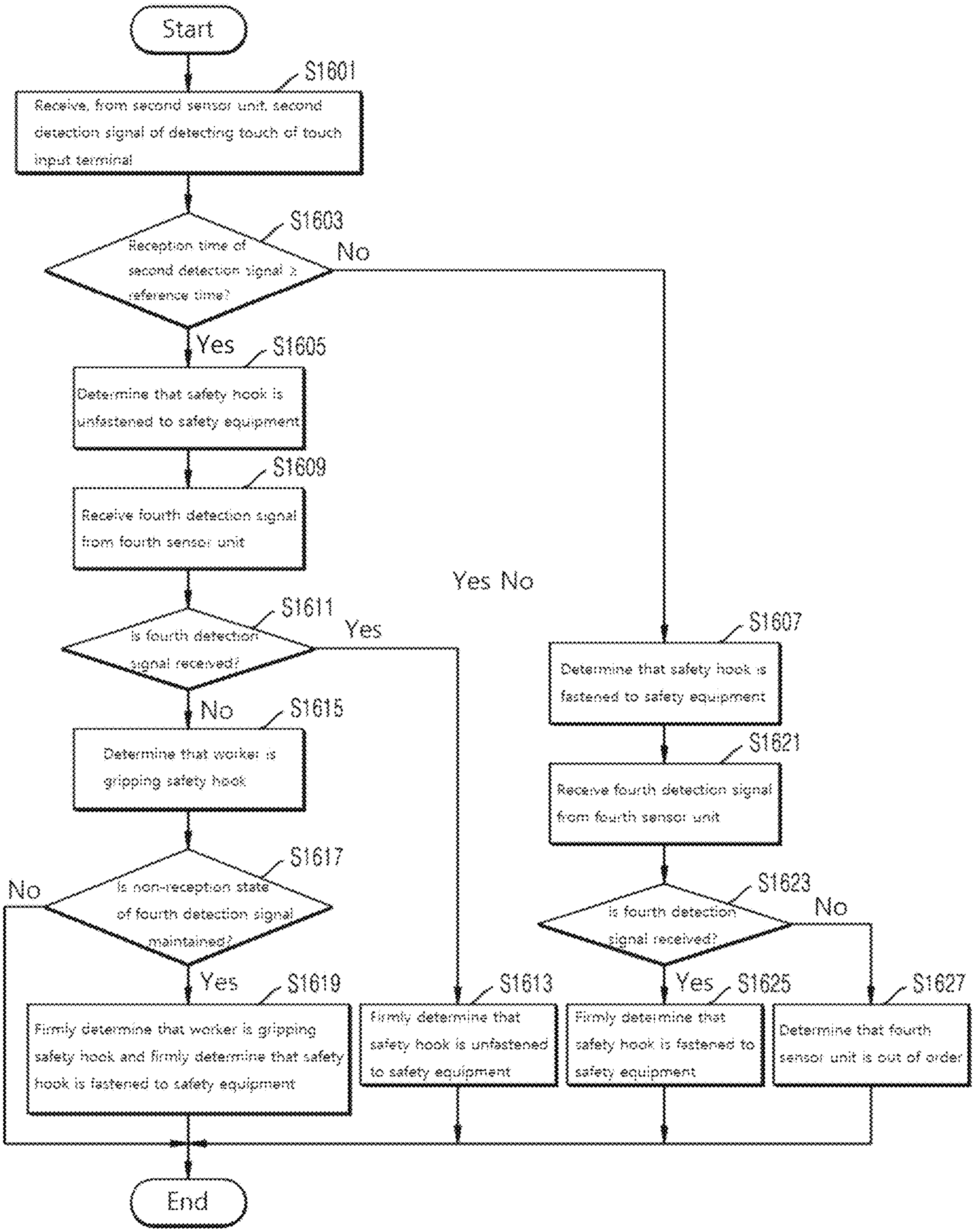

FIG. 16 is a flowchart illustrating another example of a method of determining whether a safety hook is fastened to a safety equipment according to an example embodiment. In the following, repeated description related to the description made above with reference to FIGS. 1 to 5 is omitted.

Referring to FIG. 16, in operation S1601, the processor 170 may receive a second detection signal from the second sensor unit 232.

In operation S1603, the processor 170 may determine whether the second detection signal is received for a reference time (e.g., 3 seconds) or more.

In operation S1605, when the second detection signal is received for the reference time (e.g., 3 seconds) or more, the processor 170 may determine that the safety hook 220 is unfastened to the safety equipment.

In operation S1607, when the second detection signal is received for less than the reference time (e.g., 3 seconds), the processor 170 may determine that the safety hook 220 is fastened to the safety equipment.

In operation S1609, when the second detection signal is received form the reference time (e.g., 3 seconds) or more, the processor 170 may determine that the safety hook 220 is unfastened to the safety equipment and then receive, from the fourth sensor unit 234, a fourth detection signal of detecting pressure of the safety hook 220.

In operation S1611, the processor 170 may determine whether the fourth detection signal is received from the fourth sensor unit 234.

In operation S1613, when the fourth detection signal of detecting the pressure of the safety hook 220 is received from the fourth sensor unit 234, the processor 170 may firmly determine that the safety hook 220 is unfastened to the safety equipment.

In operation S1615, when the fourth detection signal of detecting the pressure of the safety hook 220 is not received from the fourth sensor unit 234, the processor 170, the processor 170 may determine that the worker is gripping the safety hook 220.

In operation S1617, the processor 170 may determine whether a non-reception state of the fourth detection signal is maintained for a preset period of time (e.g., 3 seconds).

In operation S1619, when the non-reception state of the fourth detection signal is maintained for the preset period of time (e.g., 3 seconds), the processor 170 may firmly determine that the worker is gripping the safety hook 220 and may firmly determine that the safety hook 220 is unfastened to the safety equipment.

In operation S1621, after determining that the safety hook 220 is fastened to the safety equipment since the second detection signal is received for less than the reference time (e.g., 3 seconds) in operation S1607, the processor 170 may receive, from the fourth sensor unit 234, the fourth detection signal of detecting the pressure of the safety hook 220.

In operation S1623, the processor 170 may determine whether the fourth detection signal is received from the fourth sensor unit 234.

In operation S1625, when the fourth detection signal of detecting the pressure of the safety hook 220 is received from the fourth sensor unit 234, the processor 170 may firmly determine that the safety hook 220 is fastened to the safety equipment.

In operation S1627, when the fourth detection signal of detecting the pressure of the safety hook 220 is not received from the fourth sensor unit 234, the processor 170 may determine that the fourth sensor unit 234 is out of order.

Figure 17:
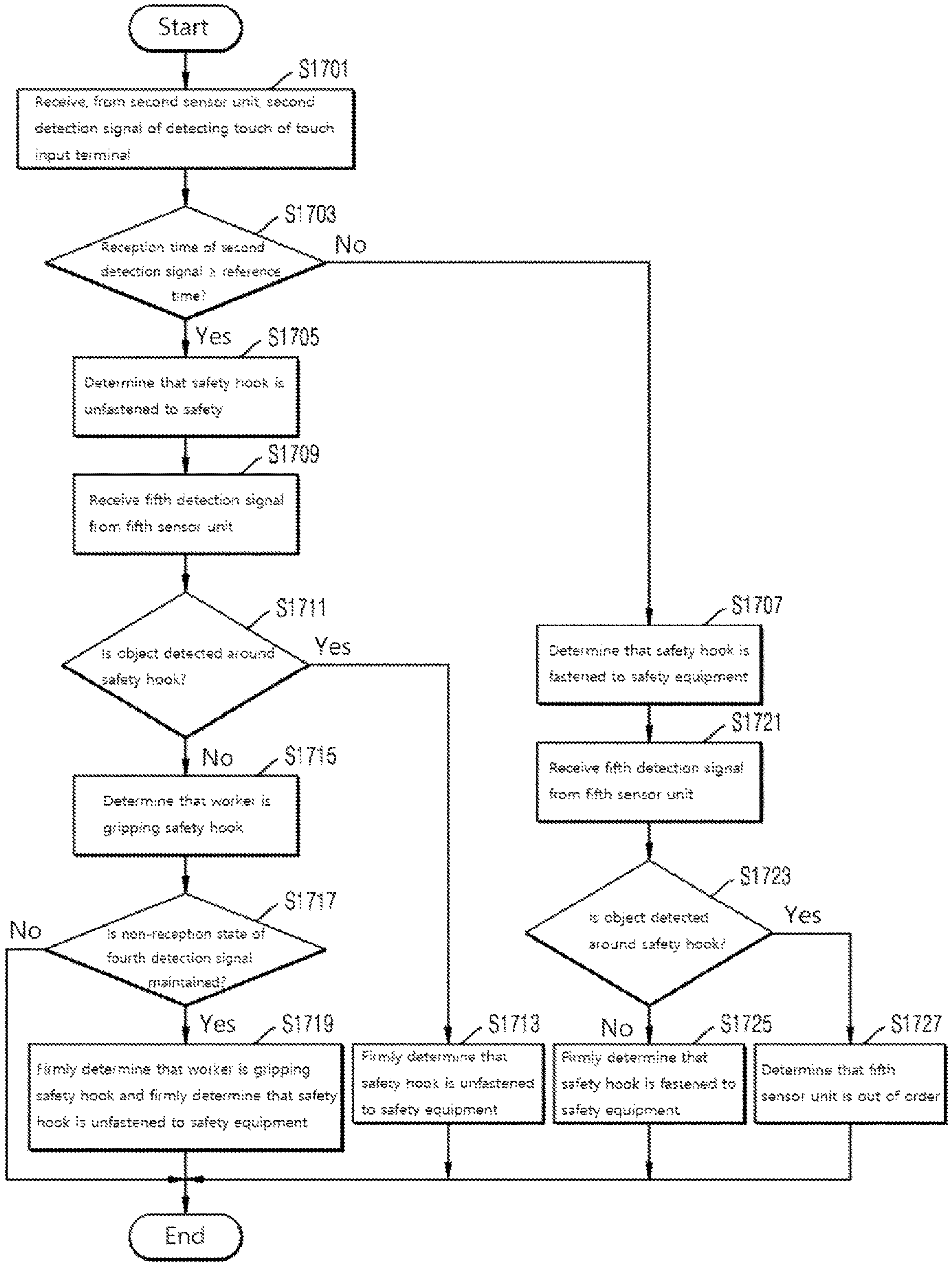

FIG. 17 is a flowchart illustrating an example of a method of determining whether a safety hook is fastened to a safety equipment according to an example embodiment. In the following, repeated description related to the description made above with reference to FIGS. 1 to 16 is omitted.

Referring to FIG. 17, in operation S1701, the processor 170 may receive a second detection signal from the second sensor unit 232.

In operation S1703, the processor 170 may determine whether the second detection signal is received for a reference time (e.g., 3 seconds) or more.

In operation S1705, when the second detection signal is received for the reference time (e.g., 3 seconds) or more, the processor 170 may determine that the safety hook 220 is unfastened to the safety equipment.

In operation S1707, when the second detection signal is received for less than the reference time (e.g., 3 seconds), the processor 170 may determine that the safety hook 220 is fastened to the safety equipment.

In operation S1709, after determining that the safety hook 220 is unfastened to the safety equipment since the second detection signal is received for the reference time (e.g., 3 seconds) or more, the processor 170 may receive, from the fifth sensor unit 235, a fifth detection signal of detecting presence or absence of an object around the safety hook 220.

In operation S1711, the processor 170 may determine whether the object is detected around the safety hook 220 based on the fifth detection signal.

In operation S1713, when the object is detected around the safety hook 220 based on the fifth detection signal, the processor 170 may firmly determine that the safety hook 220 is unfastened to the safety equipment.

In operation S1715, when no object is detected around the safety hook 220 based on the fifth detection signal, the processor 170 may determine that the worker is gripping the safety hook 220.

In operation S1717, the processor 170 may determine whether a state of detecting no object around the safety hook 220 is maintained for a preset period of time (e.g., 3 seconds).

In operation S1719, when the state of detecting no object around the safety hook 220 is maintained for the preset period of time (e.g., 3 seconds), the processor 170 may firmly determine that the worker is gripping the safety hook 220 and may firmly determine that the safety hook 220 is unfastened to the safety equipment.

In operation S1721, after determining that the safety hook 220 is fastened to the safety equipment since the second detection signal is received for less than the reference time (e.g., 3 seconds) in operation S1707), the processor 170 may receive, from the fifth sensor unit 235, the fifth detection signal of detecting presence or absence of the object around the safety hook 220.

In operation S1723, the processor 170 may determine whether the object is detected around the safety hook 220 based on the fifth detection signal.

In operation S1725, when no object is detected around the safety hook 220, the processor 170 may firmly determine that the safety hook 220 is fastened to the safety equipment.

In operation S1727, when the object is detected around the safety hook 220, the processor 170 may determine that the fifth sensor unit 235 is out of order.

Figure 18:
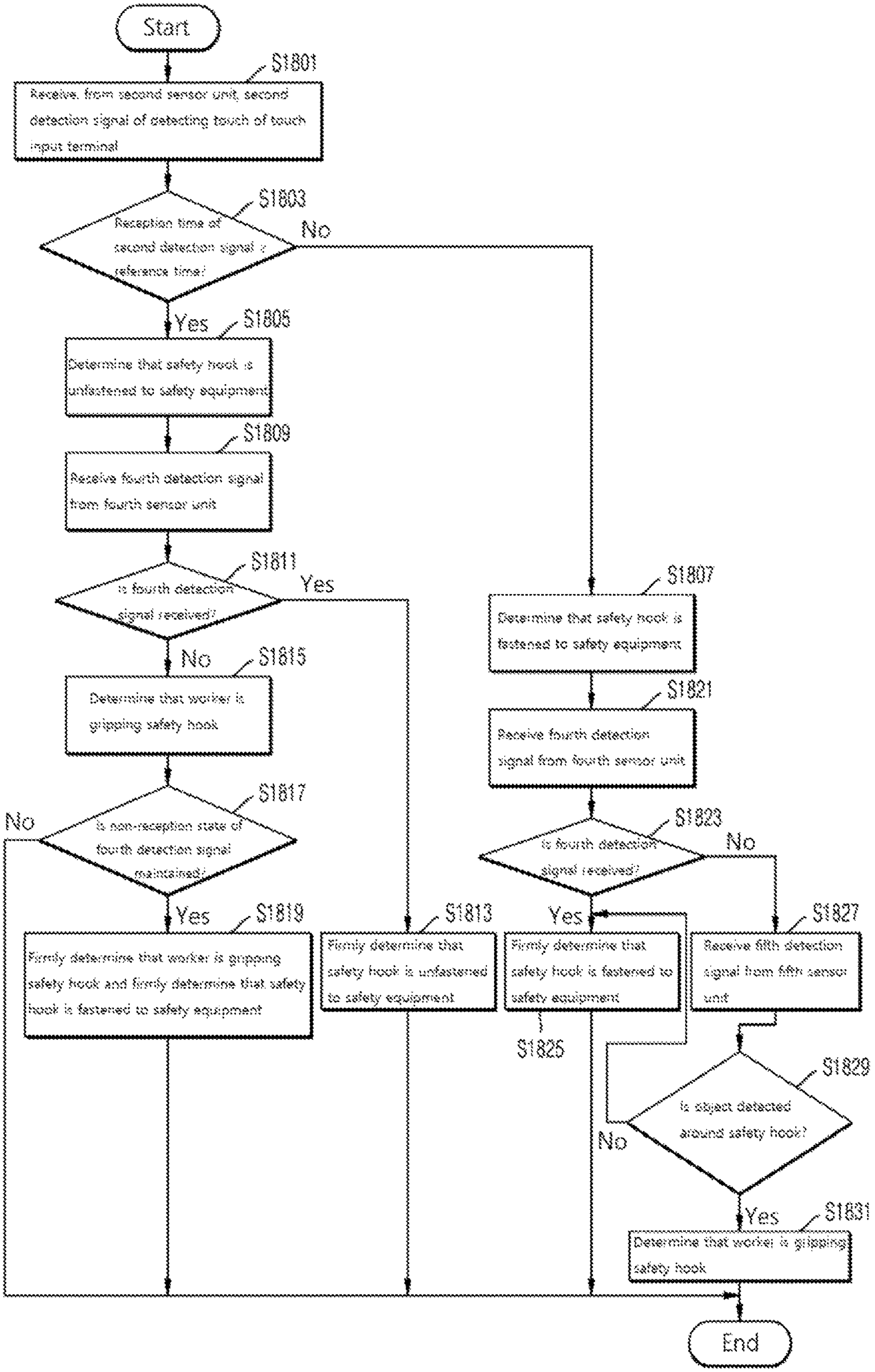

FIG. 18 is a flowchart illustrating another example of a method of determining whether a safety hook is fastened to a safety equipment according to an example embodiment. In the following, repeated description related to the description made above with reference to FIGS. 1 to 17 is omitted.

Referring to FIG. 18, in operation S1801, the processor 170 may receive a second detection signal from the second sensor unit 232.

In operation S1803, the processor 170 may determine whether the second detection signal is received for a reference time (e.g., 3 seconds) or more.

In operation S1805, when the second detection signal is received for the reference time (e.g., 3 seconds) or more, the processor 170 may determine that the safety hook 220 is unfastened to the safety equipment.

In operation S1807, when the second detection signal is received for less than the reference time (e.g., 3 seconds), the processor 170 may determine that the safety hook 220 is fastened to the safety equipment.

In operation S1809, after determining that the safety hook 220 is unfastened to the safety equipment since the second detection signal is received for the reference time (e.g., 3 seconds) or more, the processor 170 may receive, from the fourth sensor unit 234, a fourth detection signal of detecting pressure of the safety hook 220.

In operation S1811, the processor 170 may determine whether the fourth detection signal is received from the fourth sensor unit 234.

In operation S1813, when the fourth detection signal is received from the fourth sensor unit 234, the processor 170 may firmly determine that the safety hook 220 is unfastened to the safety equipment.

In operation S1815, when the fourth detection signal is not received from the fourth sensor unit 234, the processor 170 may determine that the worker is gripping the safety hook 220.

In operation S1817, the processor 170 may determine whether a non-reception state of the fourth detection signal is maintained for a preset period of time (e.g., 3 seconds).

In operation S1819, when the non-reception state of the fourth detection signal is maintained for the preset period of time (e.g., 3 seconds), the processor 170 may firmly determine that the worker is gripping the safety hook 220 and may firmly determine that the safety hook 220 is unfastened to the safety equipment.

In operation S1821, after determining that the safety hook 220 is fastened to the safety equipment since the second detection signal is received for less than the reference time (e.g., 3 seconds) in operation S1807, the processor 170 may receive a fourth detection signal of detecting pressure of the safety hook 220 from the fourth sensor unit 234.

In operation S1823, the processor 170 may determine whether the fourth detection signal is received from the fourth sensor unit 234.

In operation S1825, when the fourth detection signal is received from the fourth sensor unit 234, the processor 170 may firmly determine that the safety hook 220 is fastened to the safety equipment.

In operation S1827, when the fourth detection signal is not received from the fourth sensor unit 234, the processor 170 may receive a fifth detection signal of detecting presence or absence of an object around the safety hook 220 from the fifth sensor unit 235 provided in a first direction of the hook 221 constituting the safety hook 220.

In operation S1829, the processor 170 may determine whether the object is detected around the safety hook 220 based on the fifth detection signal. When no object is detected around the safety hook 220 based on the fifth detection signal, the processor 170 may firmly determine that the safety hook 220 is fastened to the safety equipment.

In operation S1831, when the object is detected around the safety hook 220 based on the fifth detection signal, the processor 170 may determine that the fifth sensor unit 235 is out of order.

The example embodiments may be implemented in a form of a computer program executable through various components on a computer and may be recorded in non-transitory computer-readable recording media. Here, the media may include, for example, magnetic media such as hard disks and magnetic tapes; optical media such as CD-ROMs and DVD; magneto-optical media such as floptical disks; and hardware devices specially configured to store and execute program instructions, such as read only memory (ROM), random access memory (RAM), and flash memory.

Meanwhile, the computer program may be specially designed and configured for the present disclosure and may be known and available to those skill in the art of computer software. Examples of the computer program may include high-level language code executable by a computer using an interpreter in addition to a machine language code as produced by a compiler.

In the present specification (particularly, in the claims), the use of the term "the" and terms similar thereto may correspond to both a singular form and a plural form. Also, when a range is described in the present disclosure, it includes an invention to which an individual value belonging to the range is applied (unless otherwise stated) and it may be the same as describing each individual value constituting the range in the detailed description.

Unless order is explicitly stated or stated otherwise, operations included in the methods according to example embodiments may be performed in suitable order. The present disclosure is not limited to the stated order of the operations. The use of all examples or exemplary terms (e.g., etc.) herein are simply to describe the present disclosure in detail and the scope of the present disclosure is not limited thereto unless limited by the claims. Also, it will be apparent to those skilled in the art that various modifications, combinations, and changes may be made according to design conditions and factors within the claims or equivalents thereof.

Therefore, the spirit of the present disclosure should not be limited to the example embodiments and all the scope equivalent to the claims or equivalently modified therefrom are within the scope of the spirt of the present invention.

What is claimed is:

1. A safety management method performed by a processor of a safety management apparatus, the safety management method comprising:

determining whether a safety hook connected through a connecting rope provided to a safety belt worn by a worker is fastened to a safety equipment;

loading a first score set in response to whether the safety hook is fastened to the safety equipment and a second score set in response to a duration of a state in which the safety hook is unfastened to the safety equipment, according to a result of the determination;

receiving, from a first sensor unit, a first detection signal of detecting an altitude of a worksite in which the worker is working;

loading a third score set in response to the first detection signal; and determining a risk level of the worker from a summation result of the first score, the second score, and the third score.

2. The safety management method of claim 1, wherein the determining whether the safety hook is fastened to the safety equipment comprises generating an alarm signal and transmitting the alarm signal to a terminal of the worker when it is determined that the safety hook is unfastened to the safety equipment.

3. The safety management method of claim 1, wherein the determining whether the safety hook is fastened to the safety equipment comprises:

receiving, from a second sensor unit provided to the connecting rope, a second detection signal of detecting whether a hook constituting the safety hook is touched; and determining that the safety hook is unfastened to the safety equipment when the second detection signal is received for a reference time or more and determining that the safety hook is fastened to the safety equipment when the second detection signal is received for less than the reference time.

4. The safety management method of claim 3, wherein the receiving of the second detection signal comprises receiving, from the second sensor unit provided to the connecting rope, the second detection signal of detecting whether a thin metal body attached to the connecting rope is touched through a metal body connecting wire.

5. The safety management method of claim 3, wherein the receiving of the second detection signal comprises receiving, from the second sensor unit, the second detection signal of detecting a touch of a thin metal body that is attached onto a sensor device configured to couple to the hook and comprising the second sensor unit.

6. The safety management method of claim 3, wherein the receiving of the second detection signal comprises receiving, from the second sensor unit coupled to the hook, the second detection signal of detecting whether a thin metal body attached to the connecting rope is touched.

7. The safety management method of claim 3, after the determining, further comprising:

receiving, from a third sensor unit, a third detection signal of detecting a movement of the safety hook; and firmly determining that the safety hook is fastened to the safety equipment when the movement of the safety hook satisfies a reference value based on the third detection signal and firmly determining that the safety hook is unfastened to the safety equipment when a movement detection result of the safety hook does not satisfy the reference value.

8. The safety management method of claim 3, further comprising:

firmly determining that the safety hook is unfastened to the safety equipment when a fourth detection signal of detecting a pressure of the safety hook is received from a fourth sensor unit after determining that the safety hook is unfastened to the safety equipment;

determining that the worker is gripping the safety hook when the fourth detection signal is not received from the fourth sensor unit after determining that the safety hook is unfastened to the safety equipment, and firmly determining that the worker is gripping the safety hook when the fourth detection signal is not received for a preset period of time and firmly determining that the safety hook is unfastened to the safety equipment;

firmly determining that the safety hook is fastened to the safety equipment when the fourth detection signal is received from the fourth sensor unit after determining that the safety hook is fastened to the safety equipment; and determining that the fourth sensor unit is out of order when the fourth detection signal is not received from the fourth sensor unit after determining the safety hook is fastened to the safety equipment.

9. The safety management method of claim 3, further comprising:

receiving a fifth detection signal of detecting presence or absence of an object around the safety hook from a fifth sensor unit provided in a first direction of the hook constituting the safety hook after determining that the safety hook is unfastened to the safety equipment, and firmly determining that the safety hook is unfastened to the safety equipment when the object is detected around the safety hook based on the fifth detection signal;

determining that the worker is gripping the safety hook when no object is detected around the safety hook based on the fifth detection signal, and firmly determining that the worker is gripping the safety hook when a state of detecting no object around the safety hook is maintained for a preset period of time and firmly determining that the safety hook is unfastened to the safety equipment;

firmly determining that the safety hook is fastened to the safety equipment when no object is detected around the safety hook based on the fifth detection signal after determining that the safety hook is fastened to the safety equipment; and determining that the fifth sensor unit is out of order when the object is detected around the safety hook based on the fifth detection signal after determining that the safety hook is fastened to the safety equipment.

10. The safety management method of claim 3, further comprising:

firmly determining that the safety hook is unfastened to the safety equipment when a fourth detection signal of detecting a pressure of the safety hook is received from a fourth sensor unit after determining that the safety hook is unfastened to the safety equipment;

determining that the worker is gripping the safety hook when the fourth detection signal is not received from the fourth sensor unit after determining that the safety hook is unfastened to the safety equipment, and firmly determining that the worker is gripping the safety hook when the fourth detection signal is not received for a preset period of time and firmly determining that the safety hook is unfastened to the safety equipment;

firmly determining that the safety hook is fastened to the safety equipment when the fourth detection signal is received from the fourth sensor unit after determining that the safety hook is fastened to the safety equipment;

receiving a fifth detection signal of detecting presence or absence of an object around the safety hook from a fifth sensor unit provided in a first direction of the hook constituting the safety hook when the fourth detection signal is not received from the fourth sensor unit after determining that the safety hook is fastened to the safety equipment, and firmly determining that the safety hook is fastened to the safety equipment when no object is detected around the safety hook based on the fifth detection signal; and receiving the fifth detection signal of detecting presence or absence of the object around the safety hook from the fifth sensor unit provided in the first direction of the hook constituting the safety hook when the fourth detection signal is not received from the fourth sensor unit after determining that the safety hook is fastened to the safety equipment, and determining that the fifth sensor unit is out of order when the object is detected around the safety hook based on the fifth detection signal.

11. The safety management method of claim 1, wherein the determining whether the safety hook is fastened to the safety equipment comprises:

receiving a fifth detection signal of detecting presence or absence of an object around the safety hook from a fifth sensor unit provided in a first direction of a hook constituting the safety hook; and determining that the safety hook is unfastened to the safety equipment when the object is detected around the safety hook and determining that the safety hook is fastened to the safety equipment when no object is detected around the safety hook, based on the fifth detection signal.

12. The safety management method of claim 11, wherein the receiving of the fifth detection signal comprises receiving a fifth detection signal of detecting a distance between a body of the worker and the safety hook from the fifth sensor unit provided in a first direction of the connecting rope.

13. The safety management method of claim 1, wherein the determining the risk level of the worker comprises determining one of five stages of risk levels including a safe stage, a stage of concern, a stage of caution, a stage of vigilance, and a serious stage according to the summation result of the first score, the second score, and the third score.

14. The safety management method of claim 13, after determining the risk level of the worker, further comprising:

generating an alarm signal corresponding to one of the five stages of risk levels and transmitting the alarm signal to a terminal of the worker.

15. A non-transitory computer-readable recording medium storing a computer program to implement the method of claim 1.

16. A safety management apparatus comprising:

a processor; and a memory configured to operatively connect to the processor and to store at least one code performed by the processor, wherein when executed through the processor, the memory stores a code that causes the processor to, determine whether a safety hook connected through a connecting rope provided to a safety belt worn by a worker is fastened to a safety equipment, load a first score set in response to whether the safety hook is fastened to the safety equipment and a second score set in response to a duration of a state in which the safety hook is unfastened to the safety equipment, according to a result of the determination, receive, from a first sensor unit, a first detection signal of detecting an altitude of a worksite in which the worker is working, load a third score set in response to the first detection signal, and determine a risk level of the worker from a summation result of the first score, the second score, and the third score.

* * * * *